US011809159B2

(12) United States Patent
Biernat et al.

(10) Patent No.: US 11,809,159 B2
(45) Date of Patent: Nov. 7, 2023

(54) MANAGING BLOCKCHAINS IN AN INDUSTRIAL FACILITY BASED ON FIRMWARE CHANGE

(71) Applicant: Rockwell Automation Technologies, Inc., Mayfield Heights, OH (US)

(72) Inventors: Tim S. Biernat, Franklin, WI (US); Juergen K. Weinhofer, Chagrin Falls, OH (US); Sharath Chander Reddy Baddam, Mayfield Heights, OH (US); Douglas J. Reichard, Fairview Park, OH (US); Subbian Govindaraj, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 9 days.

(21) Appl. No.: 17/150,160

(22) Filed: Jan. 15, 2021

(65) Prior Publication Data

US 2021/0132582 A1    May 6, 2021

Related U.S. Application Data

(63) Continuation of application No. 16/110,068, filed on Aug. 23, 2018, now Pat. No. 10,928,803.
(Continued)

(51) Int. Cl.
*G05B 19/418* (2006.01)
*G05B 19/4093* (2006.01)
(Continued)

(52) U.S. Cl.
CPC ... *G05B 19/4093* (2013.01); *G05B 19/41865* (2013.01); *G06F 16/248* (2019.01);
(Continued)

(58) Field of Classification Search
None
See application file for complete search history.

(56) References Cited

U.S. PATENT DOCUMENTS 10,084,826 B1     9/2018  Irwan et al.
10,826,685 B1 *  11/2020  Campagna .............. H04L 67/02
(Continued)

FOREIGN PATENT DOCUMENTS

| CN | 107508812 A | 12/2017 |
|---|---|---|
| EP | 3624026 A1 | 3/2020 |
| WO | 2017/194976 A1 | 11/2017 |

OTHER PUBLICATIONS

Non-Final Office Action received for U.S. Appl. No. 16/110,046 dated Jun. 10, 2021, 37 pages.
(Continued)

*Primary Examiner* — Bernard G Lindsay
(74) *Attorney, Agent, or Firm* — Amin, Turocy & Watson, LLP

(57) ABSTRACT

Blockchain-enabled industrial devices and associated systems are configured to support the use of industrial blockchains in connection with product and machine tracking, subscription-based industrial services, device lifecycle management, and other functions. Collections of industrial devices can collectively serve as an industrial blockchain system, with multiple such systems within a supply chain yielding an industrial blockchain ecosystem. This architecture can create distributed, decentralized, tamper-proof records of manufacturing statistics for a product, a product's history within the larger supply chain, industrial asset usage histories that can be leveraged in connection with lifecycle management, machine usage history for use in connection with subscription-based machine operation, and other such information. The blockchain-enabled industrial devices can be configured to generate multiple versions of a product or (Continued)

machine's blockchain having respective different access permissions, allowing public and private industrial data to be segregated between public and private industrial blockchains.

20 Claims, 25 Drawing Sheets

Related U.S. Application Data

(60) Provisional application No. 62/665,864, filed on May 2, 2018.

(51) Int. Cl.
  *G06F 16/27* (2019.01)
  *G06F 16/248* (2019.01)
  *H04L 9/32* (2006.01)
  *H04L 9/40* (2022.01)

(52) U.S. Cl.
  CPC .......... *G06F 16/27* (2019.01); *G05B 19/4183* (2013.01); *G05B 2219/31324* (2013.01); *G05B 2219/31397* (2013.01); *G05B 2219/31449* (2013.01); *H04L 9/3236* (2013.01); *H04L 63/0442* (2013.01)

(56) References Cited

U.S. PATENT DOCUMENTS

| | | | |
|---|---|---|---|
| 2003/0023408 | A1 | 1/2003 | Wight et al. |
| 2003/0158795 | A1 | 8/2003 | Markham et al. |
| 2004/0198374 | A1 | 10/2004 | Bajikar |
| 2010/0031351 | A1 | 2/2010 | Jung et al. |
| 2013/0212420 | A1 | 8/2013 | Lawson et al. |
| 2014/0196134 | A1 | 7/2014 | Yamaguchi et al. |
| 2014/0244433 | A1 | 8/2014 | Cruz |
| 2015/0046697 | A1 | 2/2015 | Galpin et al. |
| 2016/0164884 | A1 | 6/2016 | Sriram et al. |
| 2017/0046694 | A1 | 2/2017 | Chow et al. |
| 2017/0046799 | A1 | 2/2017 | Chan et al. |
| 2017/0243216 | A1 | 8/2017 | Kohn |
| 2017/0279774 | A1* | 9/2017 | Booz .................. G06Q 20/0658 |
| 2017/0285633 | A1 | 10/2017 | Poornachandran et al. |
| 2017/0301047 | A1 | 10/2017 | Brown et al. |
| 2017/0302663 | A1 | 10/2017 | Nainar et al. |
| 2017/0307387 | A1 | 10/2017 | Kohlhepp |
| 2017/0353309 | A1 | 12/2017 | Gray |
| 2018/0089638 | A1 | 3/2018 | Christidis et al. |
| 2018/0096175 | A1 | 4/2018 | Schmeling et al. |
| 2018/0096347 | A1 | 4/2018 | Goeringer et al. |
| 2018/0108024 | A1 | 4/2018 | Greco et al. |
| 2018/0117446 | A1 | 5/2018 | Tran et al. |
| 2018/0136633 | A1 | 5/2018 | Small et al. |
| 2018/0150835 | A1 | 5/2018 | Hunt et al. |
| 2018/0176229 | A1* | 6/2018 | Bathen .................. H04L 9/3247 |
| 2018/0188704 | A1 | 7/2018 | Cella et al. |
| 2018/0211202 | A1 | 7/2018 | Ynion, Jr. |
| 2018/0212783 | A1 | 7/2018 | King |
| 2018/0219676 | A1 | 8/2018 | Mattingly et al. |
| 2018/0253464 | A1 | 9/2018 | Kohli et al. |
| 2018/0255381 | A1 | 9/2018 | Cella et al. |
| 2018/0276600 | A1 | 9/2018 | Fuller et al. |
| 2018/0284093 | A1 | 10/2018 | Brown et al. |
| 2018/0287780 | A1 | 10/2018 | Safford et al. |
| 2018/0315055 | A1 | 11/2018 | Pickover et al. |
| 2018/0316502 | A1* | 11/2018 | Nadeau .................. H04L 9/085 |
| 2018/0341910 | A1 | 11/2018 | Broveleit |
| 2019/0073146 | A1 | 3/2019 | Ateniese et al. |
| 2019/0141054 | A1* | 5/2019 | Signorini .............. G06F 21/645 |
| 2019/0180291 | A1 | 6/2019 | Schmeling et al. |
| 2019/0238525 | A1 | 8/2019 | Padmanabhan et al. |
| 2019/0297101 | A1 | 9/2019 | Dhakshinamoorthy et al. |
| 2020/0036729 | A1 | 1/2020 | Maneval et al. |
| 2021/0349443 | A1* | 11/2021 | Falk ..................... H04L 9/3236 |

OTHER PUBLICATIONS

Non-Final Office Action received for U.S. Appl. No. 16/918,366 dated Oct. 8, 2021, 131 pages.

Final Office Action received for U.S. Appl. No. 16/110,046 dated Dec. 3, 2021, 30 pages.

Non-Final Office Action received for U.S. Appl. No. 16/110,068 dated Apr. 15, 2020, 37 pages.

Non-Final Office Action received for U.S. Appl. No. 16/110,031 dated Jan. 17, 2020, 70 pages.

Bahga et al., "Blockchain Platform for Industrial Internet of Things", Journal of Software Engineering and Applications, 9, Oct. 28, 2016, pp. 533-546.

Extended European Search Report received for European Patent Application Serial No. 19172256.0 dated Jul. 3, 2019, 24 pages.

Xu et al., "A Taxonomy of Blockchain-Based Systems for Architecture Design", IEEE International Conference on Software Architecture, DOI : 10.1109/ICSA.2017.33, Apr. 3, 2017, pp. 243-252.

Communication pursuant to Rule 69 EPC received for European Patent Application Serial No. 19172256.0 dated Nov. 11, 2019, 2 pages.

Non-Final Office Action received for U.S. Appl. No. 16/110,068 dated Dec. 11, 2019, 40 pages.

Final Office Action received for U.S. Appl. No. 16/110,068 dated Jun. 12, 2020, 51 pages.

Notice of Allowance received for U.S. Appl. No. 16/110,068 dated Oct. 30, 2020, 34 pages.

Communication Pursuant to Rules 94(3) EPC received for EP Patent Application Serial No. 19172256.0 dated Oct. 28, 2020, 06 page.

Final Office Action received for U.S. Appl. No. 16/918,366 dated Apr. 1, 2022, 84 pages.

Non-Final Office Action received for U.S. Appl. No. 16/110,046 dated May 27, 2022, 39 pages.

Non-Final Office Action received for U.S. Appl. No. 16/918,366 dated Aug. 18, 2022, 111 pages.

\* cited by examiner

MANAGING BLOCKCHAINS IN AN INDUSTRIAL FACILITY BASED ON FIRMWARE CHANGE

CROSS-REFERENCE TO RELATED APPLICATIONS

This application is a continuation of, and claims priority to, U.S. patent application Ser. No. 16/110,068, filed on Aug. 23, 2018, and entitled "MANAGING BLOCKCHAINS IN AN INDUSTRIAL FACILITY," which claims priority to U.S. Provisional Application Ser. No. 62/665,864, filed on May 2, 2018, entitled "INDUSTRIAL BLOCKCHAINS FOR MANAGEMENT, USE, AND CONTROL OF MANUFACTURING AND SUPPLY CHAIN INFORMATION." The entireties of these related applications are incorporated herein by reference.

BACKGROUND

The subject matter disclosed herein relates generally to industrial automation systems, and, more particularly, to storage, management, and distribution of manufacturing and supply chain data

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an industrial device is provided, comprising a program execution component configured to execute an industrial control program stored on the memory and to control one or more output signals to respective one or more devices of a first industrial system within a first supply chain entity in accordance with the industrial control program; and a blockchain engine configured to participate in a consensus-based validation of an event originating at a second industrial system within the first supply chain entity or at a second supply chain entity, wherein the blockchain engine is configured to validate the event in response to a determination that the industrial device and at least one other device on a blockchain network agree on a validity of the event, and in response to validation of the event, add a record of the event to a ledger of an industrial blockchain stored on the industrial device and on another industrial device of the second industrial system.

Also, one or more embodiments provide a method, comprising controlling, by an industrial device comprising a processor, one or more output signals to respective one or more devices of a first industrial system of a first supply chain entity in accordance with an industrial control program executed by the industrial device; performing, by the industrial device in cooperation with one or more other industrial devices on a blockchain network, a consensus-based validation of a manufacturing event originating at a second industrial system within the first supply chain entity or at a second supply chain entity, wherein the performing comprises validating the manufacturing event in response to a determination that the industrial device or the one or more other industrial devices agree on a validity of the manufacturing event; and in response to validation of the manufacturing event, adding, by the industrial device, a record of the manufacturing event to a ledger of an industrial blockchain stored on the industrial device and on another industrial device of the second industrial system.

Also, according to one or more embodiments, a non-transitory computer-readable medium is provided having stored thereon instructions that, in response to execution, cause an industrial device comprising a processor to perform operations, the operations comprising, executing an industrial control program; controlling, based on the executing, one or more output signals to respective one or more devices of a first industrial system of a first supply chain entity; performing, in collaboration with one or more other industrial devices on a blockchain network, a consensus-based validation of an event originating at a second industrial system within the first supply chain entity or at a second supply chain entity, wherein the performing comprises validating the event in response to a determination that the industrial device and the one or more other industrial devices agree on a validity of the event; and in response to validation of the event, appending a record of the event to a ledger of an industrial blockchain stored on the industrial device.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
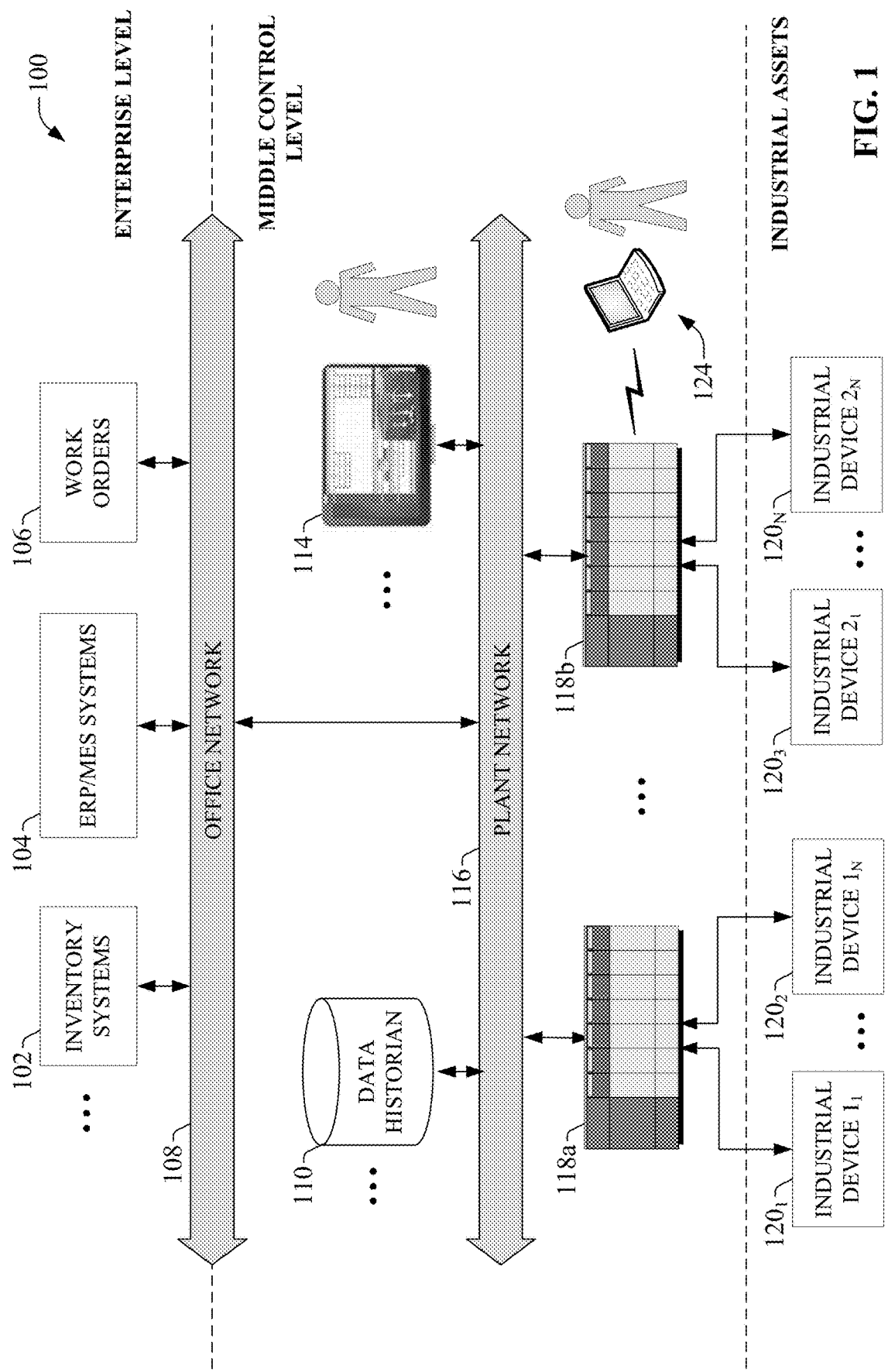
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text. These programs can be developed and downloaded to the controllers 118 using a suitable client device 124 executing a controller configuration application.

Industrial devices 120 may include both input devices that generate data relating to the controlled industrial systems to the industrial controllers 118, and output devices that respond to control signals generated by the industrial controllers 118 to control aspects of the industrial systems. Example input devices can include, but are not limited to, telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, enterprise resource planning (ERP) and/or manufacturing execution (MES) systems 104, work order management systems 106, or electronic device documentation stores containing electronic documentation for the various industrial devices making up the controlled industrial systems, repositories for machine or process drawings and documentation, vendor product documentation storage, vendor knowledgebases, internal knowledgebases, work scheduling applications, or other such systems, some or all of which may reside on an office network 108 of the industrial environment.

The industrial assets that make up a given facility—including industrial controllers 118, their associated industrial devices 120, HMIs 114, peripheral systems such as ERP systems, etc. —can generate large amounts of data during plant operation. Much of this information is tracked and recorded by various means in order to document the various manufacturing processes carried out by the assets. For example, data historians, data warehouses, or MES systems are often used to collect and archive manufacturing data generated by the industrial assets. This archived data can be leveraged to track production statistics, equipment health statistics, asset lifecycle management, inventory, key performance indicators (KPIs), power consumption, or other such factors.

The supply, manufacturing, and distribution chain for a manufactured product extends well beyond the boundaries of a single industrial facility, and crosses boundaries between several interconnected but substantially independent entities. For example, an industrial enterprise (which may comprise one or more manufacturing and warehouse facilities under a common ownership) may receive materials or component parts from one or more supplier entities that produce the materials or parts. The enterprise may also purchase industrial assets (e.g., custom-built machines, motor control cabinets, etc.) from one or more original equipment manufacturers (OEMs). Manufactured products are sold and distributed via retail outlets that may be owned and operated by entities who are independent from the industrial enterprise. While these independent entities may collect and track data generated within their own boundaries, as participants in a common supply chain these various entities may benefit from selective sharing of their collected data. Reliable and trusted sharing of data can be particularly crucial if business contracts between the entities are in place, since this shared information can ensure that the terms of the contracts are being satisfied. However, since each entity's data is typically collected and stored locally (or on protected remote storage, such as a proprietary cloud-based storage platform), shared data owned by one of the entities may not be easily and readily accessible by third parties, and trustworthiness of the shared data may be a concern.

Moreover, even within the confines of a single industrial enterprise, information may be collected and tracked using separate (and possibly disparate) systems, and under different data formats, for different production areas or departments. Aggregating this segregated data into a common presentation that yields greater insight into manufacturing or business operations can be difficult, requiring normalization of the disparate information, time synchronization between the items of data, etc.

To address these and other issues, one or more embodiments described herein relate to the use of blockchain platforms within an industrial facility as well as throughout a supply, manufacturing, and distribution chain. In one or more embodiments, industrial devices such as industrial controllers (e.g., PLCs or other types of automation controllers), motor drives, HMI terminals, telemetry devices, and other such devices are configured to support a number of industrial blockchain functions. Collections of these blockchain-enabled industrial devices can be networked to form an industrial blockchain system in which the collection of devices capture manufacturing events as transactions, which are verified using consensus-based techniques and added to an industrial blockchain associated with the product being manufactured. This creates a tamper-proof record of relevant manufacturing statistics for the product.

Blockchain-enabled industrial devices can create multiple versions of such industrial blockchains associated with respective different levels of access permissions, including public blockchains that allow all participants within an industrial blockchain ecosystem to view information relating to the product as well as private or semi-public blockchains that can only be shared with selected members of the industrial blockchain ecosystem. This can allow information regarding a manufactured product to be reliably recorded in a distributed, decentralized, tamper-proof ledger that maintains both private information for exclusive use within a plant facility as well as public or semi-public information regarding the product's path through the larger supply chain. In another example implementation, industrial blockchains and associated smart contracts can be used to track machine usage and operating statistics in connection with subscription-based machine operation or maintenance management. Other example systems that leverage industrial blockchains will also be described herein.

Figure 2:
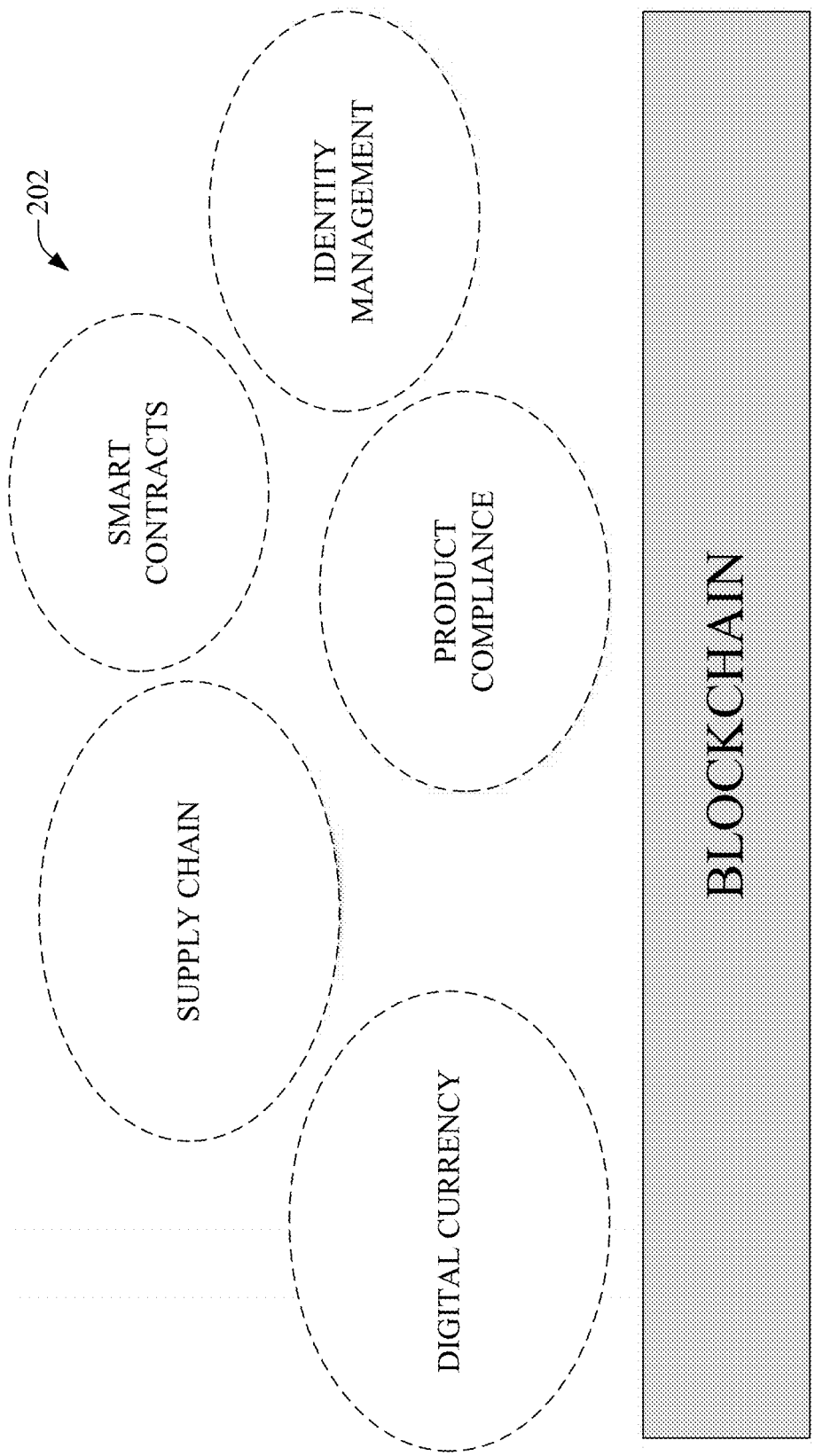
FIG. 2 is a generalized high-level diagram illustrating the relationship between blockchain technology and applications that can leverage blockchains.

A general, high-level overview of blockchain technology is provided as a precursor to discussing the industrial-specific applications of blockchain technology discussed herein. FIG. 2 is a generalized high-level diagram illustrating the relationship between blockchain technology and applications 202 that can leverage blockchains. In general, blockchain is a foundational technology upon which applications can be built to leverage the technology. Digital currency such as Bitcoin is an example application that uses a public blockchain to act as a distributed ledger in a peer-to-peer network. Blockchain technology is also used to implement smart contracts, which allow a set of contractual rules to be programmed and enforced by a network of peer-to-peer devices without requiring a third-party mediator or broker. As will be discussed in more detail herein, one or more embodiments of the present disclosure can include industrial devices and applications that leverage blockchain technology to perform supply chain tracking, verify product compliance, perform identity management, monitor and record information relating to local manufacturing operations within a single facility (e.g., within the bounds of the plant's intranet), or other such industrial functions.

Figure 3:
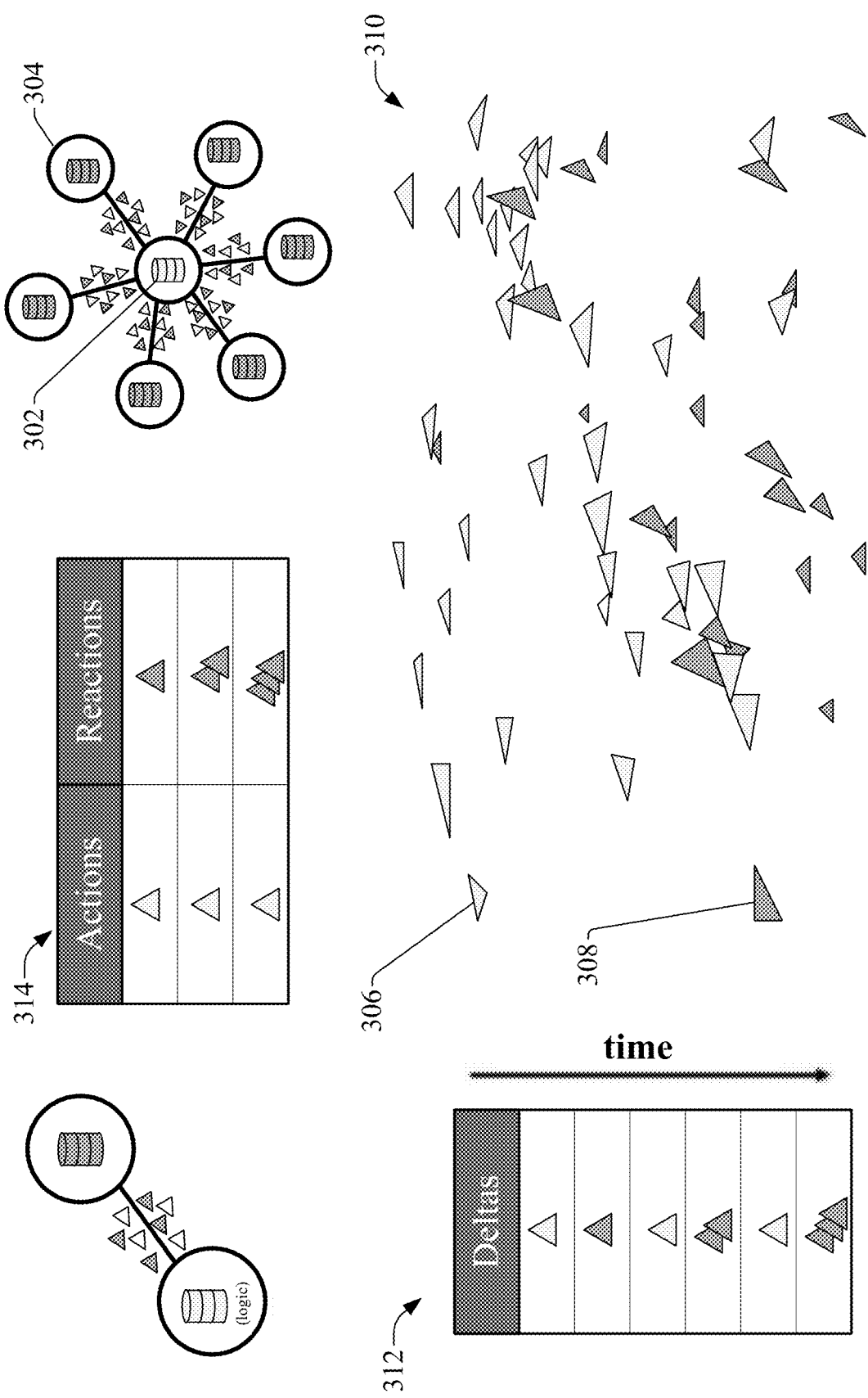
FIG. 3 is a graphic illustrating a centralized model for accessing and modifying data.

Blockchain-based platforms can provide access to data from multiple parties in a decentralized manner, in contrast to platforms that share data using a centralized model. FIG. 3 is a graphic illustrating a centralized model for accessing and modifying data. According to this centralized model, there is a single "golden copy" 302 of the data being viewed and acted upon by one or more entities 304 (e.g., systems running applications that leverage the data represented by the golden copy 302, client devices operated by respective users, etc.). Any of the entities 304 can copy data maintained on the golden copy 302 as a whole or in part. This golden copy 302 of the data model is updated by commanding state changes to the model (an example technique for communicating state changes of objects between components is described in U.S. Pat. No. 9,864,365, which is incorporated herein by reference). These state change instructions are referred to herein as "actions" 306. Copies and views of the golden copy 302 remain synchronized by observing changes to the golden copy 302 of the model. These observed changes are referred to herein as "reactions" 308. Table 314 represents a set of actions performed on the data and corresponding observed reactions accumulated as a result of the actions. The collection of actions 306 and reactions 308 can be viewed as a set of changes or deltas 310 ordered by time, as represented by table 312. This set of deltas 310 can be "played back" by any number of entities to obtain the same consistent data model, with the golden copy 302 being the model that is trusted by everyone.

Figure 4:
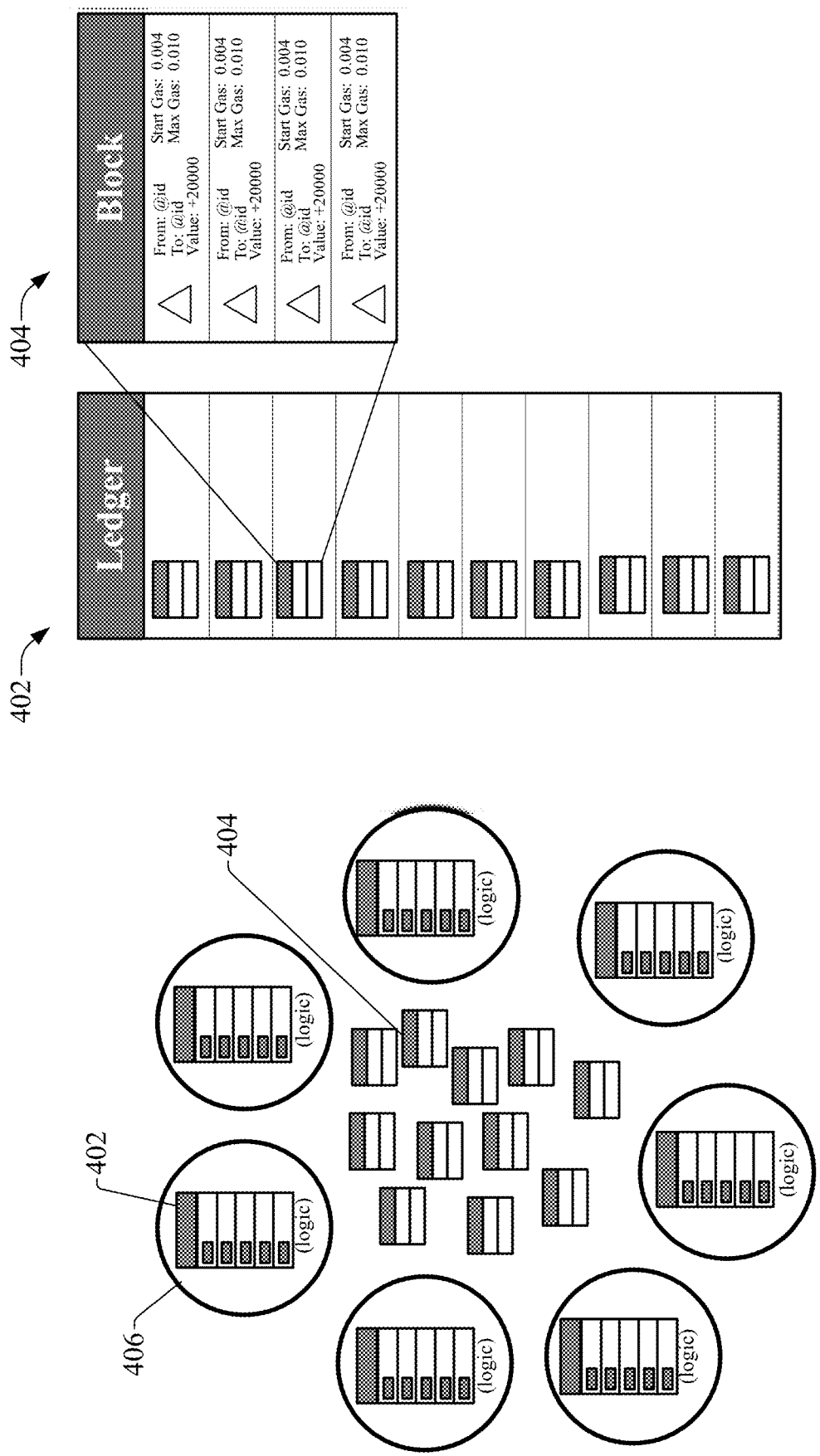
FIG. 4 is a graphic illustrating a decentralized model for accessing and modifying data.

By contrast, blockchain-driven platforms decentralize the data model, eliminating the need to maintain a golden copy 302 or distributing the multiple coordinated versions of the truth. FIG. 4 is a graphic illustrating a decentralized model. In a decentralized model, all entities 406 that interact with the data have a copy of the data, and all entities work to keep the data model's transactions ordered and consistent. Blocks 404 of changes to the data are recorded as a transaction. A distributed ledger 402 of all these changes is maintained by all entities 406 (or nodes) that participate in the platform. If all entities 406 apply the changes to their own copy of the data then the copies remain consistent across the entities 406 without the need for a single golden copy. Each entity maintains a copy of the ledger 402, which represents a continuous chain of transaction blocks 404, hence the term "blockchain." When a transaction is performed on the data by one of the entities 406, all entities 406 process the transaction and make a determination regarding the validity of the transaction. If a consensus among the entities 406 is reached regarding the transaction's validity, each entity updates its copy of the ledger 402 accordingly.

Figure 5:
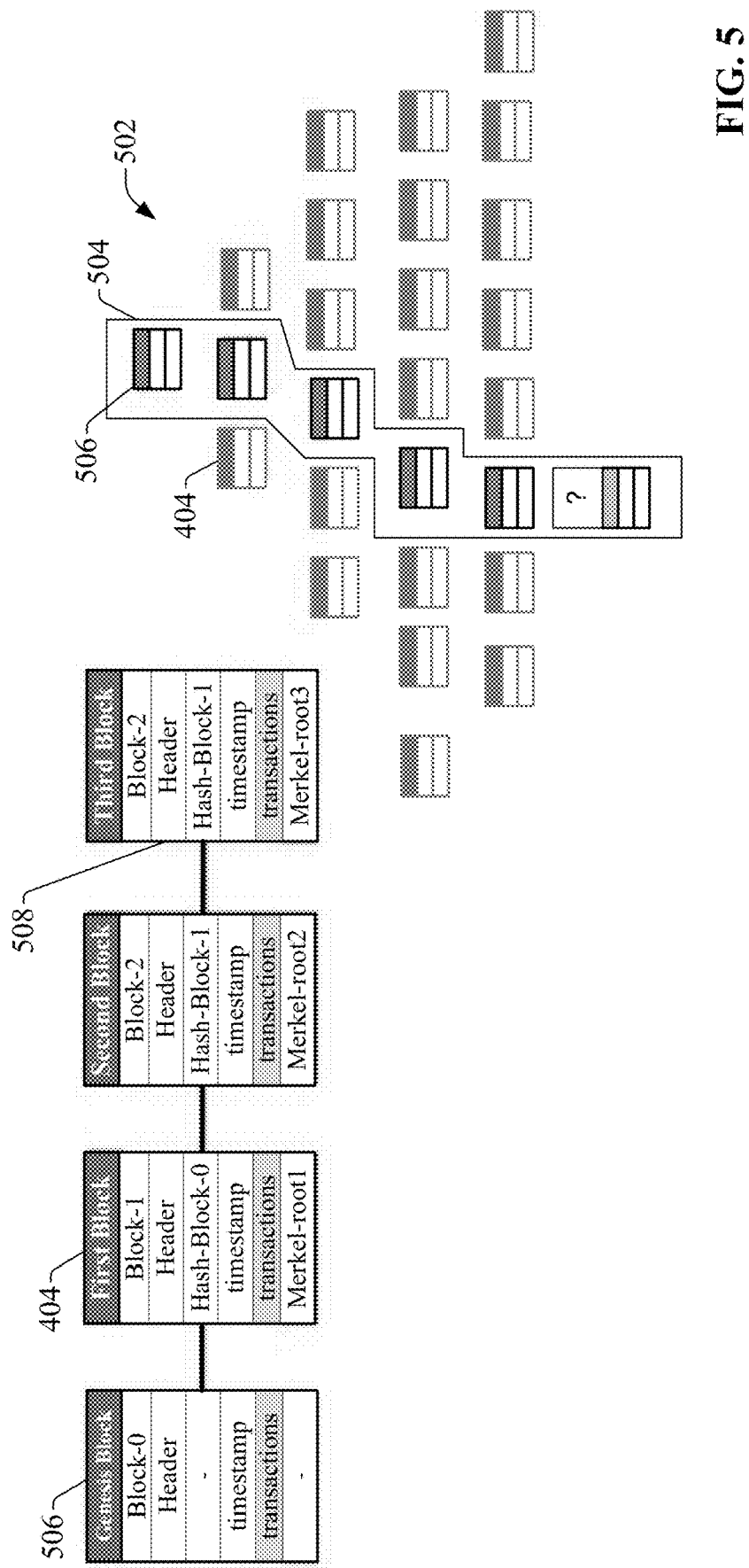
FIG. 5 is a graphic illustrating an example blockchain architecture.

A blockchain consists of a data structure that orders blocks and links the blocks cryptographically, thereby acting as an immutable, verifiable, distributed ledger. Blockchains require no central authority; instead, trust is established and enforced cryptographically, with participating nodes (e.g., devices associated with entities 406) acting as a consortium and voting on the validity of a block using a consensus mechanism to manage the distributed ledger. FIG. 5 is a graphic illustrating a blockchain architecture. Blockchains are a linked hierarchical list 502 of transaction blocks 404, where chains of related, linked transaction blocks 404 within the hierarchy (e.g., chain 504) stem from an initial genesis block 506. Each block 404 has a cryptographic identity, which is calculated by the header data 508 in the block. Each block 404 contains the hash of the previous block in the chain.

Figure 6:
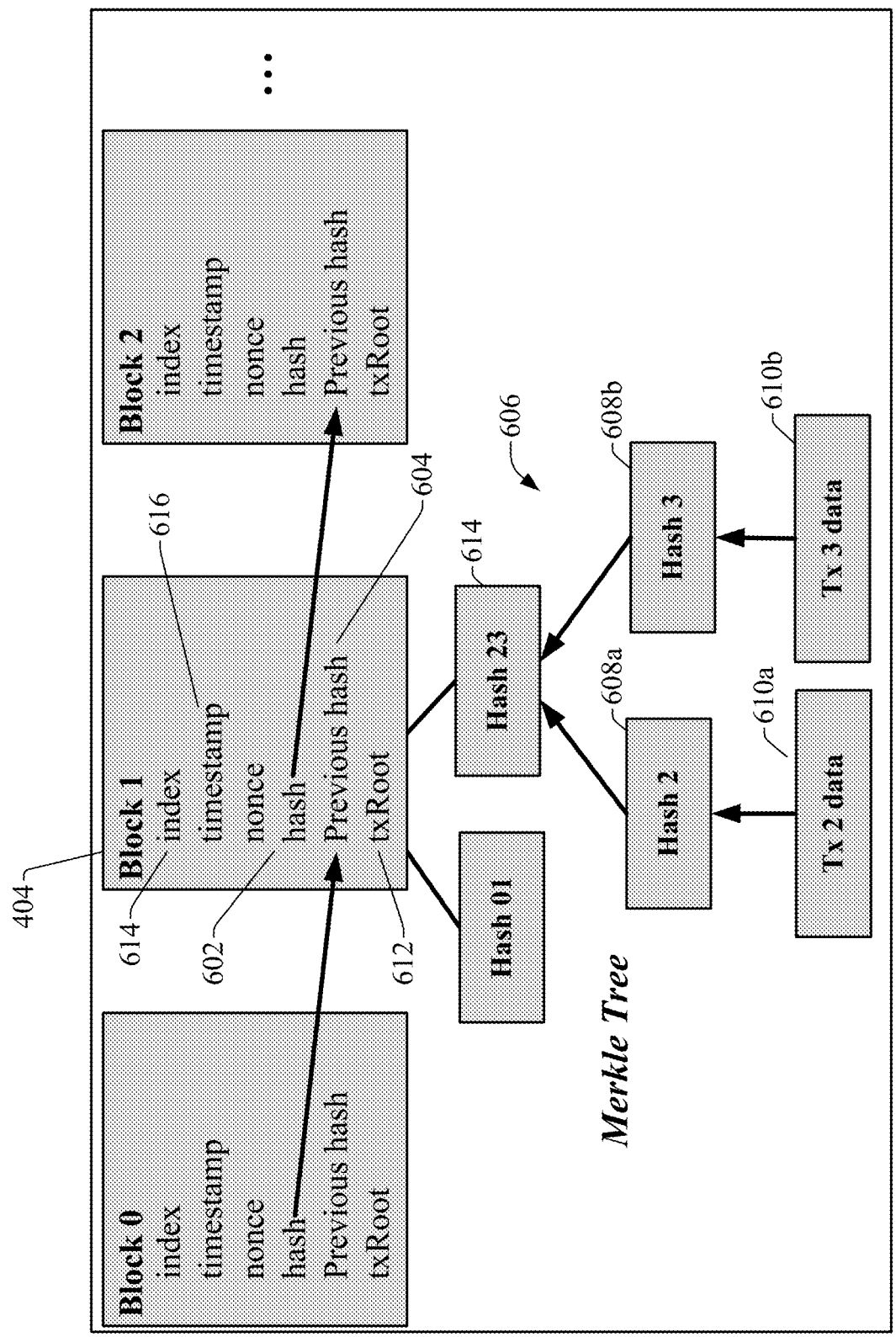
FIG. 6 is a diagram illustrating a general architecture of a blockchain.

FIG. 6 is a diagram illustrating a general architecture of an example blockchain. Data 610 associated with the block's transactions is hashed, and the collection of transaction data 610 and their associated hashes 608 create a Merkle tree 606 of hashes 608 (only two items of data 610 are shown in FIG. 6 for clarity; however, a block 404 may be associated with more than two transactions). In the illustrated example, each data item 610*a* and 610*b* is hashed to yield two corresponding hash values 608*a* and 608*b*. These two hashes 608*a* and 608*b* are combined into another hash value 602 at the next higher level in the Merkle tree hierarchy. Hash values at a given level of the Merkle tree may be combined with other hash values on that level to yield hash values at the next higher level until the top of the Merkle tree hierarchy is reached.

The Merkle tree 606 is stored separately from the block 404, and only the root fingerprint 612 (the top hash) is stored in the block 404. Each block 404 also contains a hash 604 of the content of the immediately preceding block in the chain. For each block 404, the Merkle tree of hashes 608 and the hash 604 of the previous block in the chain are used to create the hash 602 for the block. The data 610 is stored in the Merkle tree 606 separately from the block 404, with the root fingerprint 612 being the only part of the Merkle tree 606 stored in the block 404. This nesting of cryptographic hash values yields a digital fingerprint that renders unauthorized tampering difficult. Compounded with the chaining of transaction blocks 404, the blockchain becomes increasingly difficult to hack, producing a level of trustworthiness that increases over time. Improperly modifying a block 404 would require tampering with the entire transaction history, rendering tampering nearly impossible. In this way, a verifiable, tamper-proof ledger of transactions can be efficiently maintained.

Figure 7:
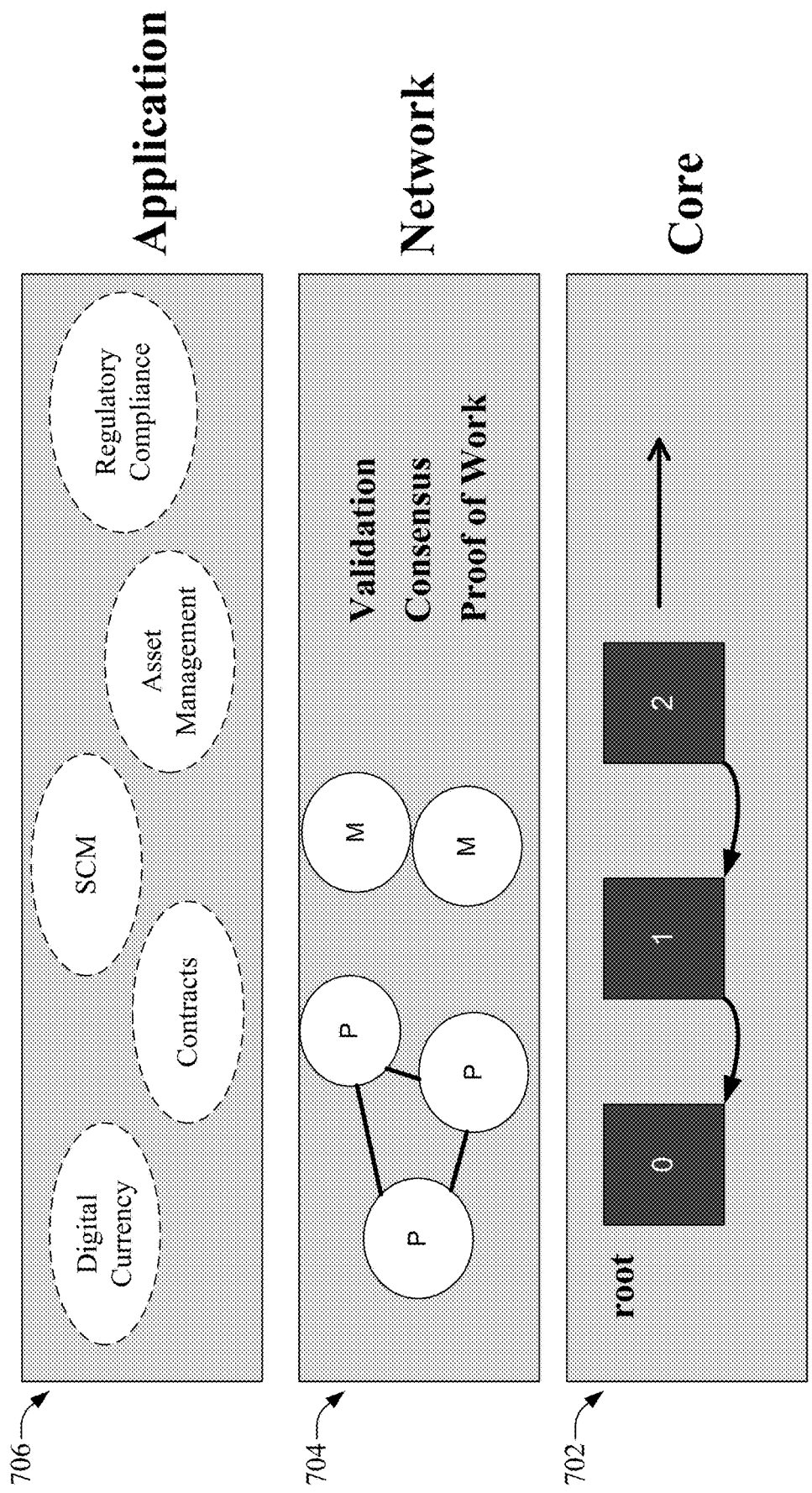
FIG. 7 is a diagram illustrating a generalized architecture of an example blockchain platform.

FIG. 7 is a diagram illustrating a generalized architecture of a blockchain platform. The core blockchain functionality 702 (the blockchain creation and management features described above) is implemented on a network 704 of participating devices or nodes (e.g., entities 406). The core blockchain ledger is distributed throughout the network, and is independently validated by network members. In a public model, the network 704 is purely peer-to-peer with no central trust authority. Instead of a central trust authority, network peers are responsible for validation and decentralized consensus for acceptance of new transactions (that is, new blocks 404 representing new transactions) into the blockchain. Public blockchains are secured by the amount of work required to create a new block 404. This proof-of-work model can prevent network peers from improperly hijacking or tampering with the blockchain. Private blockchain models—including blockchain applications used within an industrial facility as will be described herein—can employ a central authority to manage the ledger, user identities, and creation of new blocks.

Applications 706 that employ blockchains are constructed on top of the network layer, which exposes the core blockchain functions. Participants in the network 704 (the peer devices) are uniquely identified with digital signatures granted by the network. Participant identities may be anonymous depending on the type of blockchain network model (e.g., public or private). In all cases, transactions are published, visible, and verifiable on the blockchain.

Figure 8:
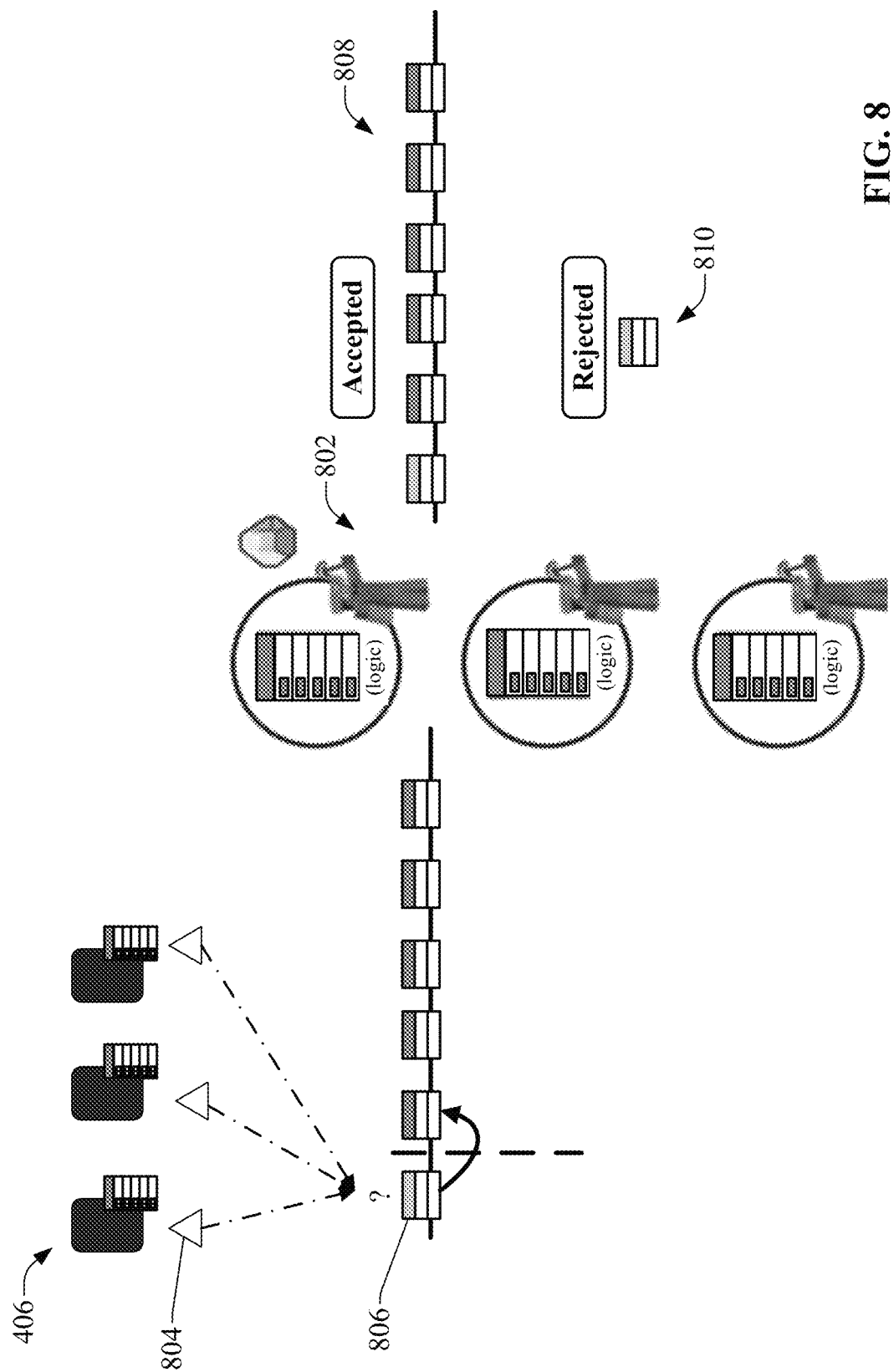
FIG. 8 is a generalized diagram illustrating creation of blocks and validation of blocks via consensus-based validation.

FIG. 8 is a generalized diagram illustrating creation of blocks and validation of blocks via consensus-based validation. Single transactions 804 performed by entities 406 (participants in the blockchain network) are gathered into blocks 806 by programmatic components executing on the entities 406 referred to as "miners" 802. Miners 802 possess the entire Merkle tree for the gathered transactions and compete to build a valid block out of the Merkle tree. The first miner 802 to create a block is rewarded. The block is then validated by the other entities 406 based on the hashes. If valid, the block is added to the blockchain 808.

Since these blocks 806 are created and validated in parallel, different versions of the truth can be generated. In these cases, the peers (entities 406) vote on which block should be used. Regardless of the final set of blocks, all choices are most likely valid. The participants in the blockchain network can validate transactions and reject invalid or nefarious transactions 810 (e.g., spending the same money twice in the case of digital currency applications). The system is ultimately consistent and valid.

Figure 9:
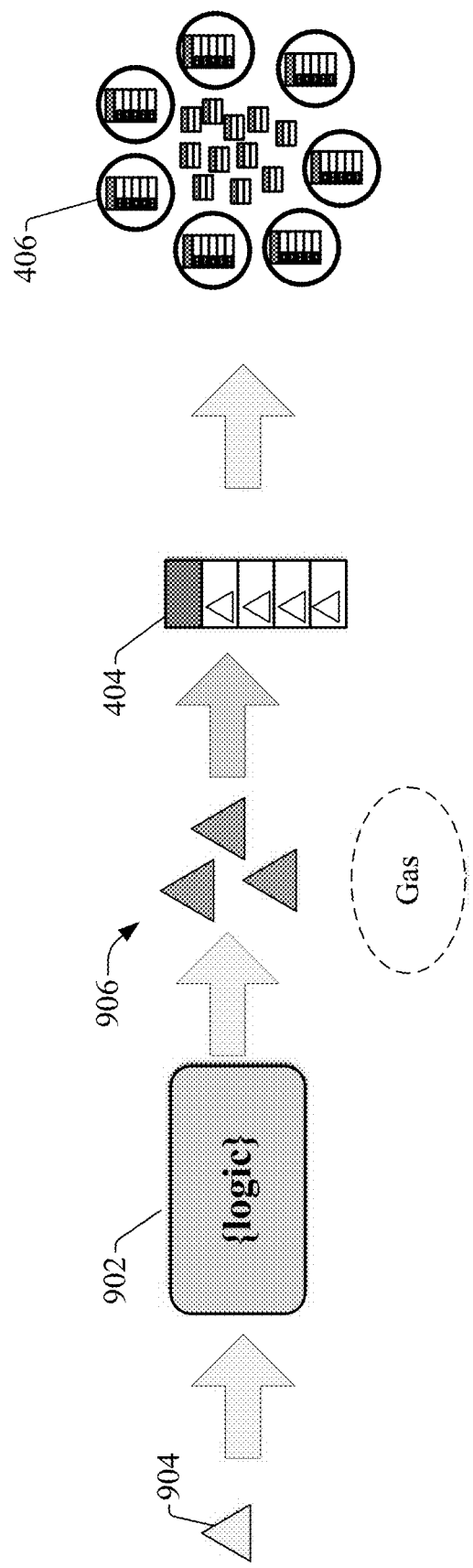
FIG. 9 is a generalized diagram illustrating implementation of smart contracts within a blockchain-driven system.

Some blockchain platforms are also capable of implementing and enforcing smart contracts, which define rules or agreements between participants in the blockchain network. FIG. 9 is a generalized diagram illustrating implementation of smart contracts within a blockchain-driven system. In general, smart contracts are sets of logic 902 that execute on the blockchain and generate new types of transactions in accordance with rules defined by the logic. The smart contract logic 902 is executed by the participants of the blockchain. When a smart contract transaction 904 is generated, the logic 902 executes on the transaction 904 and may create several new transactions 906 designed to satisfy the contract. On the Ethereum platform, units of processing "fees" must be provided by an initiator of a smart contract transaction in order to execute the transaction. On the Ethereum platform, these fees are referred to as Ether or "gas." The amount of gas required to execute a transaction is generally proportional to the amount of work required to execute the transaction. The more complex the transaction, the more gas must be spent to execute the transaction. These processing "fees" can be used to prioritize transactions based on relative values of the transactions, and can also protect against Denial of Service attacks (e.g., attacks that place the contract's logic in an infinite loop). Work on selected transactions can be prioritized by assigning extra gas to the transactions.

Figure 10:
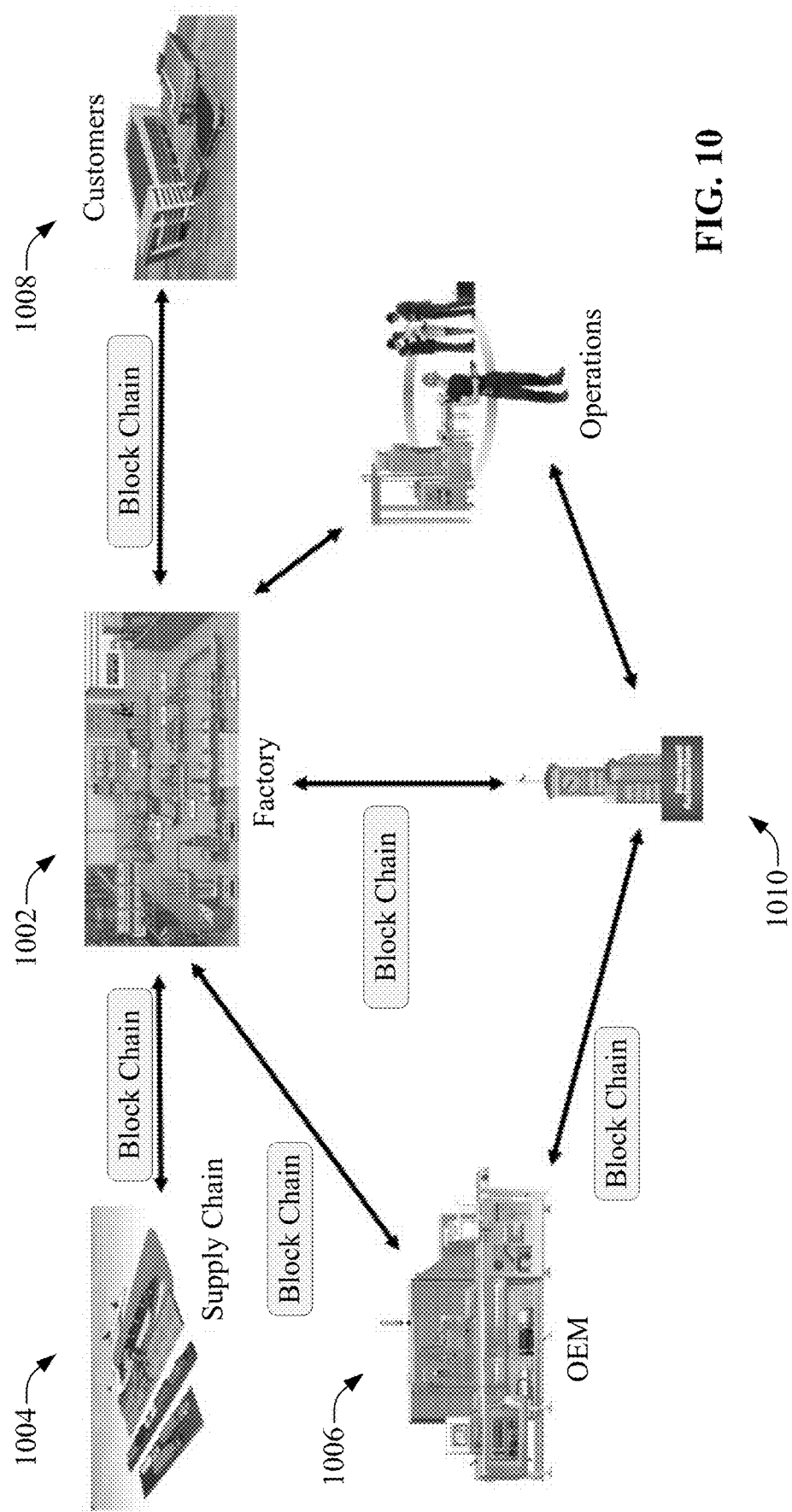
FIG. 10 is a high-level overview of entities and enterprises within an industrial supply and distribution chain within which industrial-specific blockchains can be utilized.

Various embodiments described herein leverage aspects of blockchain platforms within the context of industrial facilities, industrial enterprises, and manufacturing and distribution supply chains. To this end, industrial devices such as industrial controllers, motor drives, data historians, telemetry devices, HMIs, and other such industrial devices are configured to support creation, validation, and sharing of blockchains. FIG. 10 is a high-level overview of entities and enterprises within an industrial supply and distribution chain within which industrial-specific blockchains can be utilized. In general, blockchain-enabled industrial devices can utilize blockchain technology in connection with such tasks as asset and product lifecycle management within a factory 1002; device, machine, line, or factory configuration integrity tracking; regulatory compliance verification; auditing of lock out/tag out safety procedures within the factory 1002; customer/partner entitlements management, management and tracking of supply chains 1004 across enterprise boundaries; inventory management across a supply chain; contracts management; tracking of manufactured products across enterprises of a supply chain or within a factory 1002; or other applications to be discussed herein.

The use of blockchains between industrial enterprises can also open the possibility of subscription-based services between OEMs 1006 and owners of factories 1002, or between a manufacturing entity and its customers. Blockchains can also be used to track manufactured products to the end consumers 1008, and public blockchain data generated by a product's traversal through the manufacturing and supply chain can be accessed by consumers 1008 to obtain information about their purchased products. A device vendor 1010 can manufacture and provide blockchain-enabled industrial devices that are used within industrial factories 1002, OEM facilities 1006, and other enterprises to facilitate blockchain-driven industrial applications. The device vendor 1010 can also act as a trust authority for blockchain-driven systems that are implemented by the blockchain-enabled industrial devices. Robust identity management for organizations, people, and products that participate in an industrial blockchain system can ensure the trustworthiness of the participants and the blockchain data. Both public and private blockchain models can be implemented depending on the needs of the industrial application using the platform.

Figure 11:
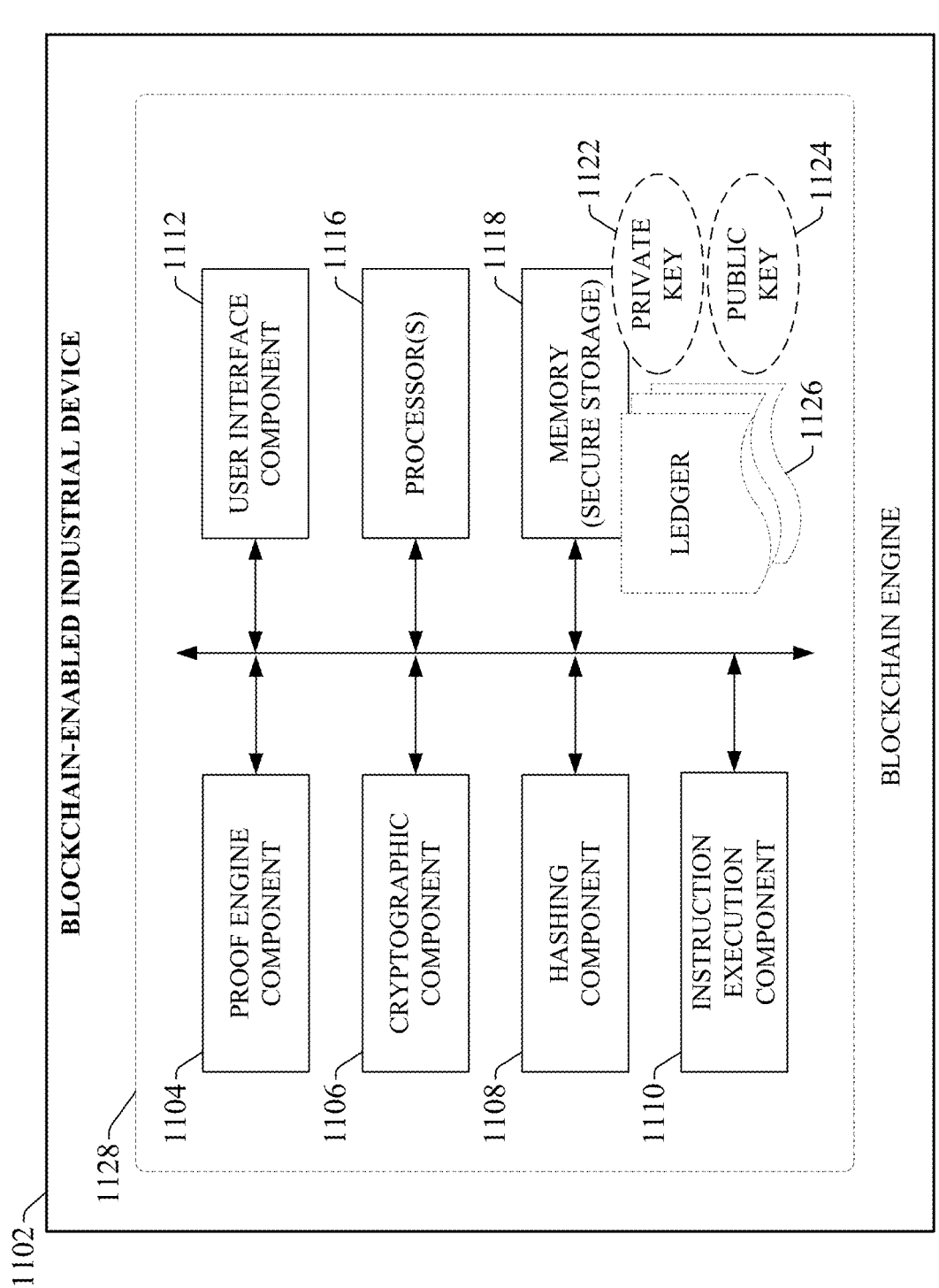
FIG. 11 is a block diagram of an example blockchain-enabled industrial device.

FIG. 11 is a block diagram of an example blockchain-enabled industrial device 1102 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described. In some embodiments, one or more of the machine-executable components can also be embodied on silicon chips or other microprocessing platforms.

Blockchain-enabled industrial device 1102 can comprise substantially any type of data-generating industrial device, including but not limited to an industrial controller, a motor drive, an HMI terminal, a vision system, an industrial optical scanner, a meter, a telemetry device, an industrial safety device, a safety relay, a barcode stamper, an ERP server, an MES server, an industrial Internet of Things (IIoT) device, or other such device or system. Industrial device 1102 can include a proof engine component 1104, a cryptographic component 1106, a hashing component 1108, an instruction execution component 1110, a user interface component 1112, one or more processors 1116, and memory 1118. In various embodiments, one or more of the proof engine component 1104, a cryptographic component 1106, a hashing component 1108, an instruction execution component 1110, a user interface component 1112, the one or more processors 1116, and memory 1118 can be electrically and/or communicatively coupled to one another to perform one or more of the functions of the blockchain-enabled industrial device 1102. In some embodiments, components 1104, 1106, 1110, and 1112 can comprise software instructions stored on memory 1118 and executed by processor(s) 1116. Blockchain-enabled industrial device 1102 may also interact with other hardware and/or software components not depicted in FIG. 11. For example, processor(s) 1116 may interact with one or more external user interface devices, such as a keyboard, a mouse, a display monitor, a touchscreen, or other such interface devices.

Proof engine component 1104 can be configured to validate industrial or supply chain transactions for inclusion in a new block of an industrial blockchain in accordance with a blockchain instruction. Cryptographic component 1106 can be configured to encrypt and decrypt transaction data, recipe data, or other information exchanged with other blockchain-enabled industrial devices within a blockchain system or ecosystem. In some embodiments, cryptographic component 1106 can leverage private keys 1122 and public keys 1124 in connection with encryption and decryption of blockchain information. Hashing component 1108 can be configured to hash transaction data and generate Merkle trees in accordance with a blockchain instruction. Instruction execution component 1110 can be configured to execute industrial blockchain instructions that create blocks representing transactions received or executed by the blockchain-enabled industrial device 1102, add the blocks to industrial blockchains maintained on the device 1102, and update the device's blockchain ledger 1126.

User interface component 1112 can be configured to receive user input and to render output to the user in any suitable format (e.g., visual, audio, tactile, etc.). In some embodiments, user interface component 1112 can be configured to communicatively interface with a development application that executes on a client device (e.g., a laptop computer, tablet computer, smart phone, etc.) that is communicatively connected to the blockchain-enabled industrial device 1102 (e.g., via a hardwired or wireless connection). The user interface component 1112 can then receive user input data and render output data via the development application. In other embodiments, user interface component 1112 can be configured to generate and serve suitable graphical interface screens to a client device, and exchange data via these graphical interface screens. Input data that can be received via user interface component 1112 can include, but is not limited to, user-defined control programs or routines that include industrial blockchain instructions, blockchain configuration parameters (which may be provided as configuration parameters of the blockchain instructions), or other such data.

The one or more processors 1116 can perform one or more of the functions described herein with reference to the systems and/or methods disclosed. Memory 1118 can be a computer-readable storage medium storing computer-executable instructions and/or information for performing the functions described herein with reference to the systems and/or methods disclosed. As will be described in more detail below, processor(s) 1116 and memory 1118 may be segregated from the primary memory that performs the device's real-time control functions. Collectively, components 1104-1112 described above (or a subset thereof) can be viewed as a blockchain engine 1128 that supplements an industrial device's native functionality with blockchain-related functionality, as will be described in more detail below.

Figure 12:
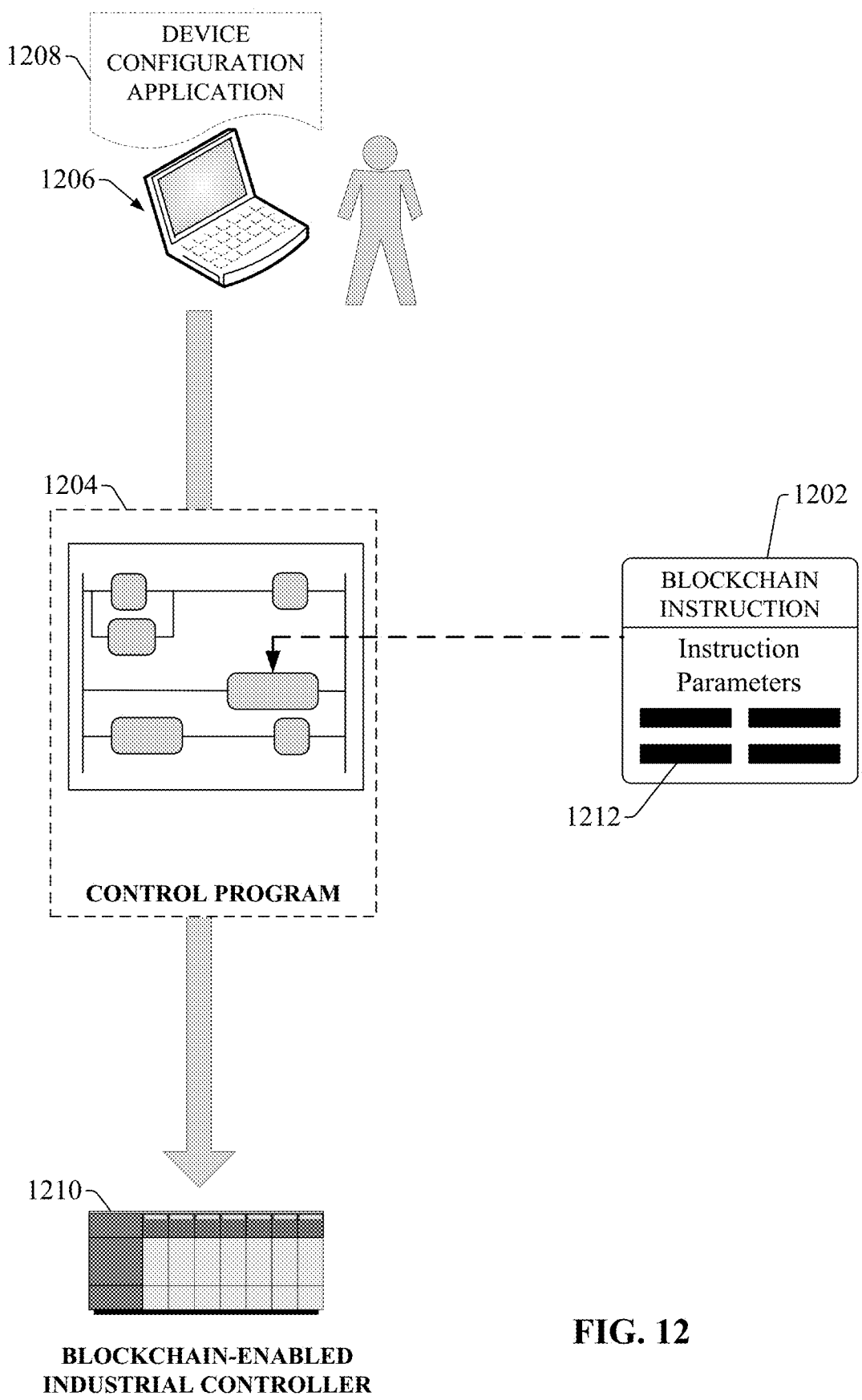
FIG. 12 is a diagram illustrating configuration of an example blockchain-enabled industrial controller.

In various embodiments, industrial devices such as industrial controllers, motor drives, HMI terminals, industrial appliances, industrial Internet of Things (IIoT) devices, and other such devices are provided with integrated blockchain creation, validation, sharing, and management functionalities. In some embodiments, aspects of these blockchain functions can be configured by the device owner. FIG. 12 is a diagram illustrating configuration of a blockchain-enabled industrial controller 1210, which may be a hardware controller, a soft controller, a cloud-based controller or other type of industrial controller. Although the example illustrated in FIG. 12 depicts an industrial controller 1210 as the blockchain-enabled device, it is to be appreciated that industrial blockchain functionality is not limited to implementation on industrial controllers. Blockchain-enabled industrial controller 1210 can be configured using a suitable device configuration application 1208 (e.g., a ladder logic development application) that executes on a client device 1206 (e.g., a laptop computer, a desktop computer, a tablet computer, a human-machine interface terminal, etc.). Using device configuration application 1208, a user can develop and download a control program 1204 (e.g., a ladder logic program, a sequential function chart program, function block diagrams, structured text, etc.) to the controller 1210, as well as configure the controller's I/O modules and individual I/O parameters, networking parameters, and other such configurable features.

Device configuration application 1208 also supports inclusion of configurable blockchain instructions 1202 within the control program 1204 for execution by the industrial controller 1210. Each blockchain instruction 1202 added to the control program 1204 can have an associated set of instruction parameters 1212 that can be configured by the user via the device configuration application 1208. Example instruction parameters 1212 for an industrial blockchain instruction 1202 can include, but are not limited to, production parameters of a manufactured product for which a blockchain is to be created, prior blockchain information that is expected to be received from other entities that participate in the blockchain (e.g., other controllers or industrial devices within the plant, outside entities that participate in a supply or manufacturing chain such as OEMs or part suppliers, etc.), supplier entities that provide materials or components for the manufactured product (if the supplier does not provide its own blockchain from which this information can be derived), an expiration time or expiration event for the blockchain defining a time that the blockchain can be deleted (in scenarios in which the blockchain only has utility for a limited time during production and can therefore be transient rather than persistent), or other such configuration aspects. In general, blockchain instruction 1202, when executed by the controller's instruction execution component 1110 (which may be part of the controller's program execution component 1306 in some embodiments; see FIG. 13), can create a block representing a number of transactions received or executed by the controller 1210, and add the block to an existing internal blockchain maintained on the controller 1210 or send the block to another node device in the production line or supply chain.

To simplify configuration of industrial devices to manage blockchains, device configuration application 1208 can include a library of code specific to blockchain creation and management by industrial devices. Such libraries can include sets of blockchain instructions that are specific to defined industries, verticals, or industrial applications. For example, a Brew software library may include blockchain instructions specific to brewery systems. These industry- or application-specific blockchain instructions can set the root of the blockchain based on the selected industry or vertical and auto-generate code for configuring the blockchain in accordance with common standards used within the selected industry. Other user-configurable instruction parameters of these industry-specific blockchain instructions may allow the developer to specify parameters of their specific application (e.g., the number of brewing vats being used) that may vary across different implementations.

In some embodiments, device configuration application 1208 can allow users to configure blockchains to be generated by a blockchain-enabled device 1102 (e.g., controller 1210 or another type of industrial device) using unified modeling language (UML) diagrams or other interfaces for creating linkages and defining hierarchies. A blockchain editor of device configuration application 1208 can allow the user to define dependency diagrams that include automation objects maintained in the blockchain-enabled industrial device 1102. Each automation object defines the data and behavior of its associated device or data object, and can be set to be either public or private via the blockchain editor. The editor can display all available automation objects supported by the industrial device 1102 and let the user check the objects to be included in the blockchain. In some embodiments, the blockchain editor can also allow dependency diagrams to be drawn to define reliance between objects. Inheritance rules can be leveraged for automation objects to automatically determine parents. The editor can also allow users to define whether an automation object is to be traced or untraced, where setting an object to be traced makes the object the root of the blockchain, and multiple traced automation objects yield a hierarchy of dependencies. In this way, industrial automation blockchains can be defined without requiring complicated programming Device configuration application 1208 can also include a template editor that can be used to define smart contracts to be enforced by the blockchain.

A blockchain tester or simulator can also be used to verify operation of the industrial blockchain before deployment. In an example scenario, an OEM may simulate a blockchain associated with their machine before shipping the machine to a customer (e.g., a manufacturing entity). In such scenarios, the blockchain can be run on the OEM's local network to confirm that the blocks are generated correctly.

Figure 13:
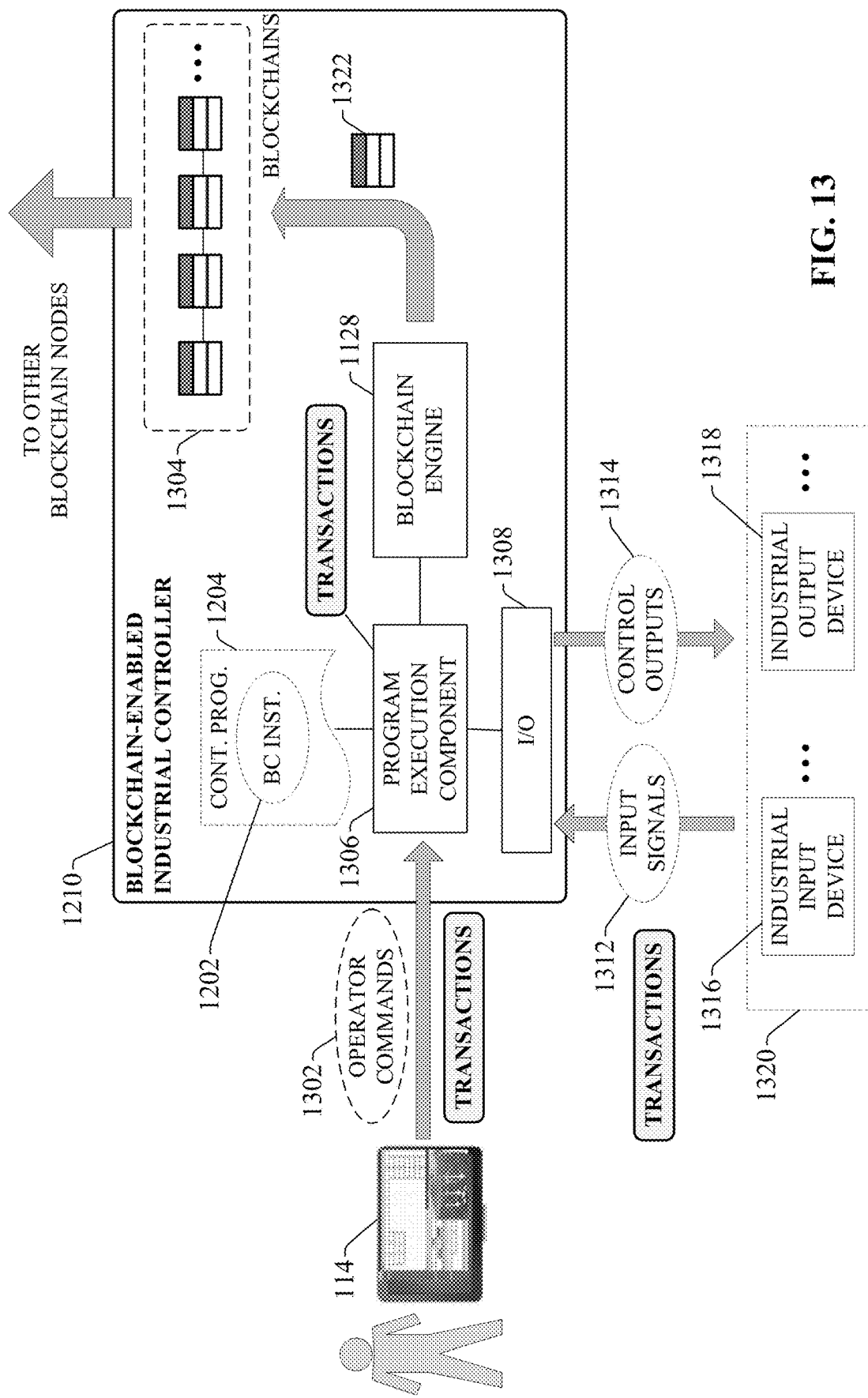
FIG. 13 is a diagram illustrating operation of an example blockchain-enabled industrial controller during runtime.

FIG. 13 is a diagram illustrating operation of the blockchain-enabled industrial controller 1210 during runtime. As noted above, one or more blockchain-enabling components of controller 1210 (e.g., components 1104-1110 described above in connection with FIG. 11) can implement a blockchain engine 1128 on the controller 1210 that supplements the controller's native functionality (e.g., execution of industrial control programs and associated I/O control in the case of industrial controllers) with blockchain-related functionality. In various embodiments, blockchain engine 1128 can be implemented as a special-purpose chip, a firmware module embedded in the blockchain-enabled industrial controller 1210, a component built into the hardware design, a software module executing in an open operating system, or another implementation.

Blockchain-enabled industrial controller 1210 includes a program execution component 1306 that executes a control program 1204, which was developed and installed on the controller 1210 as described above in connection with FIG. 12. As noted above, control program 1204 can include one or more blockchain instructions 1202 that facilitate creation of transaction blocks and management of industrial blockchains that include these blocks.

To facilitate monitoring and control of an industrial machine, system, or process 1320 during runtime, controller 1210 receives input signals 1312 from one or more industrial input devices 1316 (e.g., sensors, telemetry devices, etc.) via the controller's analog and/or digital I/O 1308, and program execution component 1306 generates analog and/or digital control outputs 1314 directed to one or more industrial output devices 1318 (e.g., actuators, motor drives, contactors, indicator lights, etc.) based on values of the input signals 1312 and control sequences defined by the control program 1204. Control outputs 1314 can also be initiated in response to or based on operator commands 1302 received via an HMI 114 or other type of user interface or faceplate (e.g., the user controls of a motor drive). These operator commands 1302 can, for example, modify setpoint values or other parameters of the control sequence, initiate or halt control actions, select operating modes for the control sequence, or perform other types of manually initiated actions. In general, blockchain-enabled industrial controller 1210 is capable of carrying out basic real-time monitoring and control functionality typically associated with industrial controllers.

In addition, blockchain engine 1128 is capable of executing blockchain instructions 1202 included in the control program 1204 and previously configured by the controller programmer. For example, blockchain instruction 1202 can be configured to recognize specific user-defined events as transactions to be added to a block 1322. Such transactions can include, for example, detected events or measured metrics observed on the controlled machine, system, or process 1320 based on input signals 1312 (e.g., temperature, pressure, or flow metrics; quality check results such as bolt torque or leak test values; etc.), operator actions identified based on the operator commands 1302 or operator interactions with control panel devices or safety devices (e.g., pushbuttons, switches, light curtains, safety mats, safety pull cords, etc.), programmatic events generated internally by the controller 1210 based on execution of control program 1204 (e.g., alarm events, controller diagnostic events, etc.), deviations of measured telemetry values from a defined range, detected states of industrial sensors, changes of states of industrial safety devices (e.g., light curtains, emergency stop push buttons, pull cords, safety mats, etc.), or other such recordable transactions.

In accordance with the configuration parameters associated with the blockchain instruction 1202, blockchain engine 1128 can assign one or more industrial transactions to a block 1322 having a format similar to those described above (see, e.g., FIGS. 5 and 6) and assign the block 1322 to a blockchain 1304. The determination as to whether a single transaction is to be added to a block 1322 or, alternatively, if multiple transactions are to be aggregated into a block can depend in part on the workflow of the manufacturing process or user-defined preferences. As will be discussed in more detail below, blockchain 1304 can be one or both of a public blockchain or a private blockchain. In some embodiments, the instruction parameters 1212 of the controller's blockchain instructions 1202 can allow a user to configure whether a block 1322 is to be added for each individual transaction or whether multiple transactions are to be bundled into a single block 1322. In the latter case, the parameters 1212 can also allow the user to define the conditions for bundling transactions into a single block. For example, a blockchain instruction 1202 can be configured that bundles a selected set of data items or events into a block 1322 upon completion of a defined production cycle corresponding to a single manufactured part or batch. In this way, each block 1322 can be associated with a set of transactions and data corresponding to a single part or production cycle. Other capture triggers or capture criteria that initiate capturing of a control event and adding a record of the event to a block 1322 can also be configured using blockchain instruction 1202. For example, blockchain instruction 1202 can be configured to capture one or more controller values or control event information on a periodic basis, to capture the controller values or control event information in response to a defined condition of the control event (e.g., when a measured performance parameter falls outside a defined range, in response to completion of a production cycle, etc.), to capture the controller values or control event information in response to a manual request to capture control event information received from an HMI or another device, etc. Blockchain engine 1128 can validate industrial transactions as well as add data to the blockchain 1304.

Figure 14:
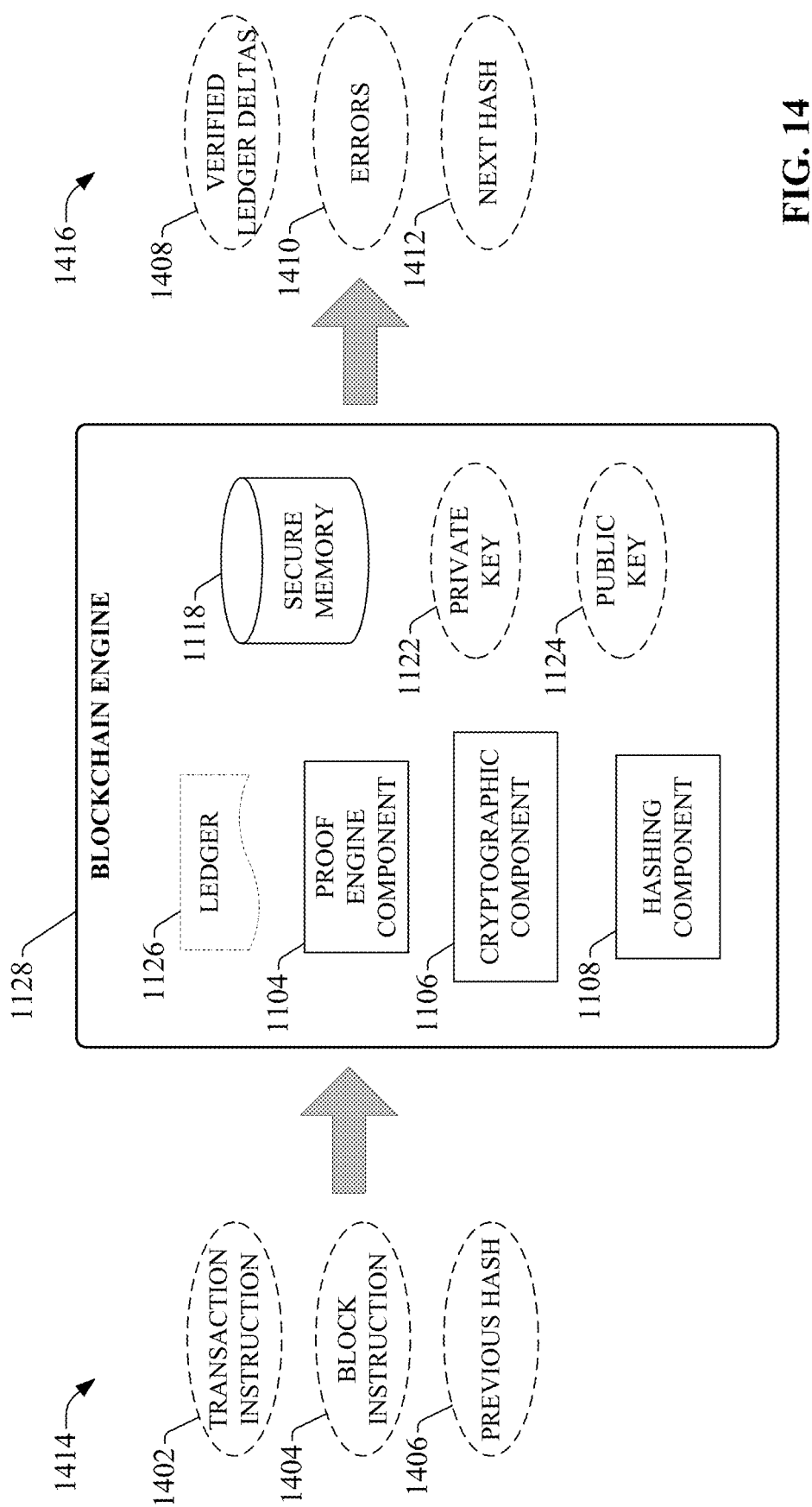
FIG. 14 is a diagram illustrating example inputs to the industrial blockchain engine and example outputs generated by the blockchain engine.

FIG. 14 is a diagram illustrating example inputs 1414 to the industrial blockchain engine 1128 and example outputs 1416 generated by the blockchain engine 1128. In general, blockchain engine 1128 allows industrial devices and applications (e.g., industrial controller 1210 or other types of blockchain-enabled industrial devices 1102 such as HMI terminals, motor drives, sensor and telemetry devices, IIoT devices, ERP and MES systems, industrial gateway devices, industrial data historians, or other such devices) to participate in a blockchain network comprising other blockchain-enabled industrial devices as well as non-industrial blockchain entities. In some implementations, the industrial blockchain network can reside entirely within the confines of a manufacturing facility on the plant's local intranet, such that the distributed database represented by the industrial blockchain is accessed exclusively by authorized plant personnel (e.g., a private blockchain). In other implantations, the blockchain network can comprise multiple entities within a manufacturing, supply, and retail chain, and access permissions to the blockchain information can be layered such that the degree of access is a function of user identity and/or role. In such implementations, the blockchain can comprise both public and private data, permitting selective access to information maintained in the distributed, de-centralized database.

In some embodiments, blockchain-enabled industrial devices 1102 can be configured to support different types of blockchain instructions that execute different blockchain functions. For example, a transaction instruction 1402 can be used to configure the blockchain engine 1128 to generate hashes for transaction data in connection with generating a new block 1322, as well as to perform block validation. The blockchain engine's hashing component 1108 can be configured to hash transaction data and generate Merkle trees in accordance with the transaction instruction 1402. Since new blocks leverage the hash of the previous block in the chain to generate the hash for the new block, blockchain engine 1128 can also receive the previous hash 1406 of the previous block in the chain. If the previous block comprises transactions that were generated by the controller 1210 itself, the previous hash 1406 may have been generated by the blockchain engine 1128 itself when the previous block was generated. In some scenarios, depending on the manufacturing workflow and the architecture of devices that execute the manufacturing process, the previous block of transactions may have been generated by another blockchain-enabled industrial device 1102 (e.g., another blockchain-enabled controller 1210 or another type of blockchain-enabled industrial device 1102) or by a third-party entity. In such scenarios, the previous hash 1406 may be received by the industrial controller 1210 from another device or system in the blockchain peer network. This previous hash 1406 together with the data for a set of transactions to be included in a new block are used to generate the next hash 1412 for the block. The proof engine component 1104 can be configured to validate transactions for inclusion in the new block in accordance with the transaction instruction 1402. In some embodiments, the proof engine component 1104 can cooperate with a consortium of other devices on the blockchain system to determine the validity of the transactions using consensus-based techniques. Similar to the techniques described above in connection with FIG. 8, proof engine component 1104 can leverage miners—programmatic entities that build blocks based on Merkle tree information for gathered transactions—in connection with consortium-based validation of blocks of transactions.

A block instruction 1404 (e.g., blockchain instruction 1202 in the case of industrial controllers) can configure the blockchain engine 1128 to perform updates to the controller's ledger 1126 to add one or more transactions of a new block after the block's transactions have been validated by proof engine component 1104. The proof engine component 1104 can also validate transactions generated by other node devices on the industrial blockchain network in accordance with a consensus-based validation technique, and broadcast its validation findings regarding the validity of the transactions to other node devices on the blockchain network (e.g., other blockchain-enabled industrial devices 1102). In an example scenario, proof engine component 1104 can send information regarding a control event originating on its associated blockchain-enabled industrial device 1102 to one or more other devices on the industrial blockchain network for validation. The proof engine component 1104 of the originating device, as well as those of the other devices on the blockchain network, can independently validate the authenticity of the control event using a suitable consensus-based validation technique (e.g., proof-of-work, proof-of-state, practical *byzantine* fault tolerance, etc.). The blockchain engines 1128 share their independently derived conclusions with one another, and will only update their respective blockchain ledgers 1126 if at least a minimum number of the devices report that the control event is authentic.

In some embodiments, blockchain engine 1128 can broadcast validated transactions as verified ledger deltas 1408 that can be used by other devices on the blockchain network to update their own ledgers 1126. Proof engine component 1104 can also update the device's own copy of ledger 1126 based on verified ledger deltas received from other devices on the blockchain network to ensure that validated transactions originating elsewhere on the network are recorded in the device's own ledger 1126. Blockchain engine 1128 can also generate and send information regarding errors 1410 discovered in a block of transactions (either a self-generated block or a block received from another device on the blockchain network).

In some embodiments, blockchain-enabled industrial devices 1102 may be configured such that only nodes (blockchain-enabled industrial devices) affected by a transaction will verify the transaction in order to reduce CPU usage relative to verifying the entire blockchain. In such embodiments, the proof engine component 1104 of an industrial device 1102 may be configured to select whether to perform validation analysis on a given block of transactions based on a determination of whether the transactions of the block are relevant to the device's own monitoring and control operations. In an example implementation, the blockchain engine 1128 can allow a user to specify transaction criteria that the industrial device 1102 will use as a basis for determining the types of transactions on which the device will perform validation analysis. Example transaction criteria can include, but are not limited to, identities a subset of other devices in the blockchain system whose transactions will be validated by the device 1102, identities of machines or industrial processes whose transactions will be validated by the device 1102, or other such criteria. Based on this configuration information, the proof engine component 1104 will perform its validation analysis only on transactions that satisfy the defined criteria. This selective merit-based verification of blocks can conserve processing resources on the industrial device 1102 relative to verifying all blocks of a blockchain, while ensuring that all transactions are reliably verified by at least a subset of industrial devices 1102 to which the transactions are most relevant.

In some embodiments, blockchain engine 1128 can also include a private key 1122 and a public key 1124 that can be used by the controller 1210 or other industrial device 1102 to securely share information with other entities on the blockchain network. As will be discussed in more detail herein, this can include secure sharing of recipe data for execution on a selected industrial controller or at a selected industrial facility.

Figure 15:
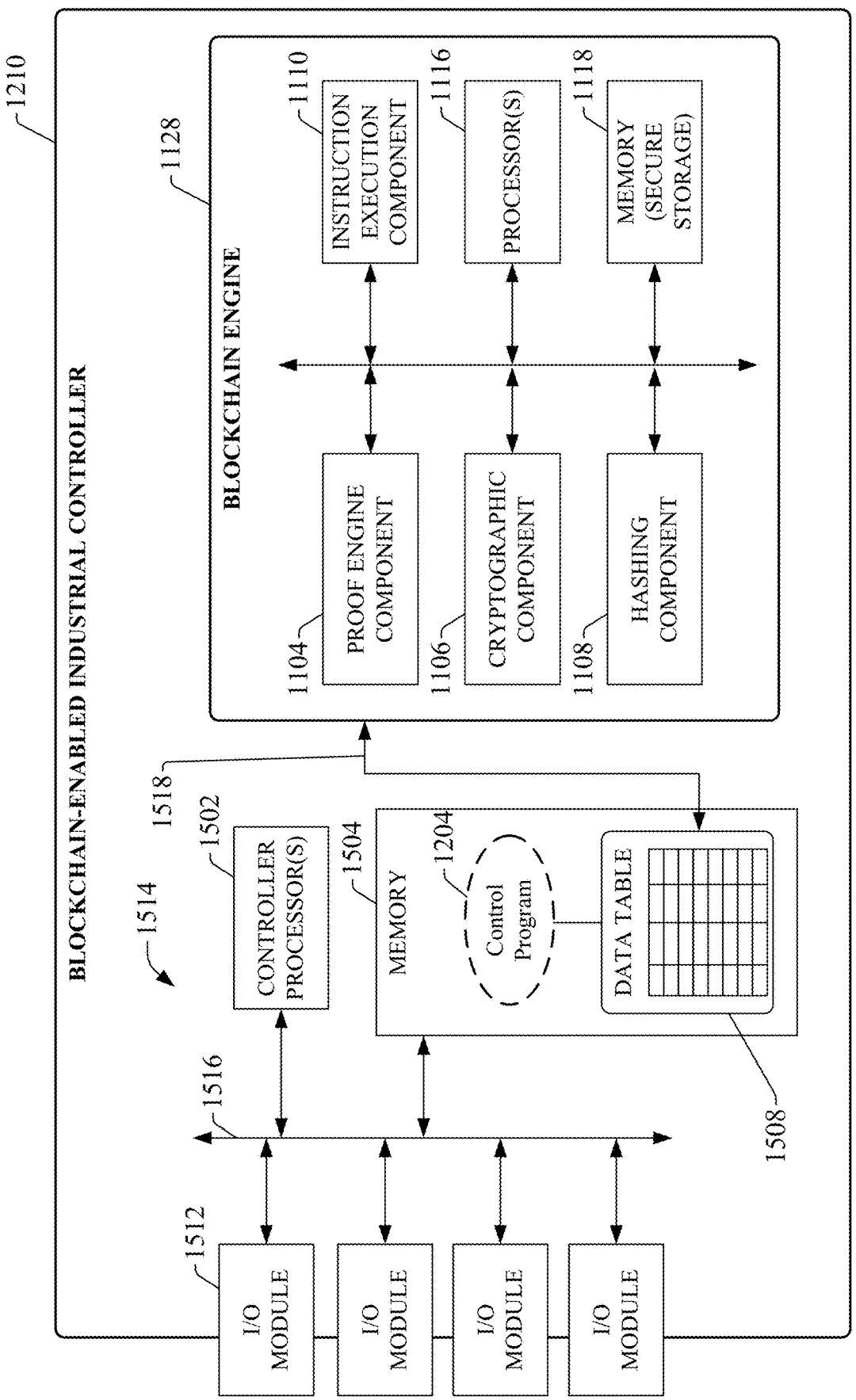
FIG. 15 is a diagram of example blockchain-enabled industrial controller in which hardware and processing resources for carrying out industrial blockchain functions are segregated from processing resources that carry out the controller's primary control functionality.

Each blockchain-enabled industrial device 1102 can include a secure storage area (e.g., memory 1118) that is separate from the storage used for real-time monitoring and control. Similarly, processing resources used by the blockchain-enabled industrial devices 1102 can be segregated from the primary processing resources that perform real-time monitoring and control (e.g., the processing resources used to execute control program 1204 and update the device's I/O). In this way, execution of blockchain functionality on the industrial device 1102 does not impact performance of the device's primary monitoring and control functions. In some embodiments, this can be achieved using multi-core processing to partition blockchain transactions from real-time control. FIG. 15 is a diagram of example blockchain-enabled industrial controller 1210 illustrating that hardware and processing resources for carrying out industrial blockchain functions are segregated from processing resources that carry out the controller's primary control functionality. In this example architecture, control components 1514 can include a memory 1504 on which is stored the control program 1204 executed by the controller 1210 and the data table 1508 that stores real-time values of the controller's digital and analog inputs and outputs, setpoint values, calculated values, or other data tag values. Control components 1514 also include one or more I/O modules 1512, which interface the controller 1210 with input and output devices (not shown) that make up a controlled industrial system or process. I/O modules 1512 are communicatively connected to the controller's backplane 1516 or communication bus, and exchange data with the data table 1508 via the backplane 1516. I/O modules 1512 can include input modules that measure aspects of the controlled system as digital and/or analog signals (e.g., 4-20 mA signals, 0-10 VDC signals, switched input voltages, etc.) and write these values to designated data tags or memory addresses of data table 1508. I/O modules 1512 can also include output modules that read digital or analog values from designated data tags or memory addresses of data table 1508 and translate these values into output signals (e.g., switched outputs, 4-20 mA output signals, 0-10 VDC output signals, etc.) directed to output devices of the controlled system. One or more controller processors 1502 or execution engines execute the control program 1204 and control updating of data values in the data table 1508 in accordance with measured data from the I/O modules 1512 and execution of the control program 1204.

In this illustrated example, blockchain engine 1128 is embodied as a sub-system of controller 1210, and is implemented using separate memory and processing resources from control components 1514. For example, blockchain engine 1128 can utilize its own processor 1116 and memory 1118, which are separate from controller processor(s) 1502 and memory 1504. In this way, blockchain functions (e.g., transaction processing and validation, block generation, smart contract processing and enforcement, etc.) performed by the blockchain engine 1128 is segregated from control-related analytics, and is not necessarily implemented using the primary control language of the controller 1210. While components of the blockchain engine 1128 can read data from and write data to the controller's data table 1508 (e.g., via a data bus 1518) in connection with performing blockchain creation and management functions, the processing resources used to carry out these blockchain functions are physically separated from those used to carry out control. In this way, blockchain functions carried out by the blockchain engine 1128 do not impact performance of the controller's basic control functionality. As noted above, although FIG. 15 depicts the embedded blockchain engine 1128 as being a sub-system of an industrial controller, blockchain engine 1128 can also be embedded on other types of industrial devices, including but not limited to motor drives, industrial sensors, vision systems, safety relays, barcode stampers, or other such devices.

Figure 16:
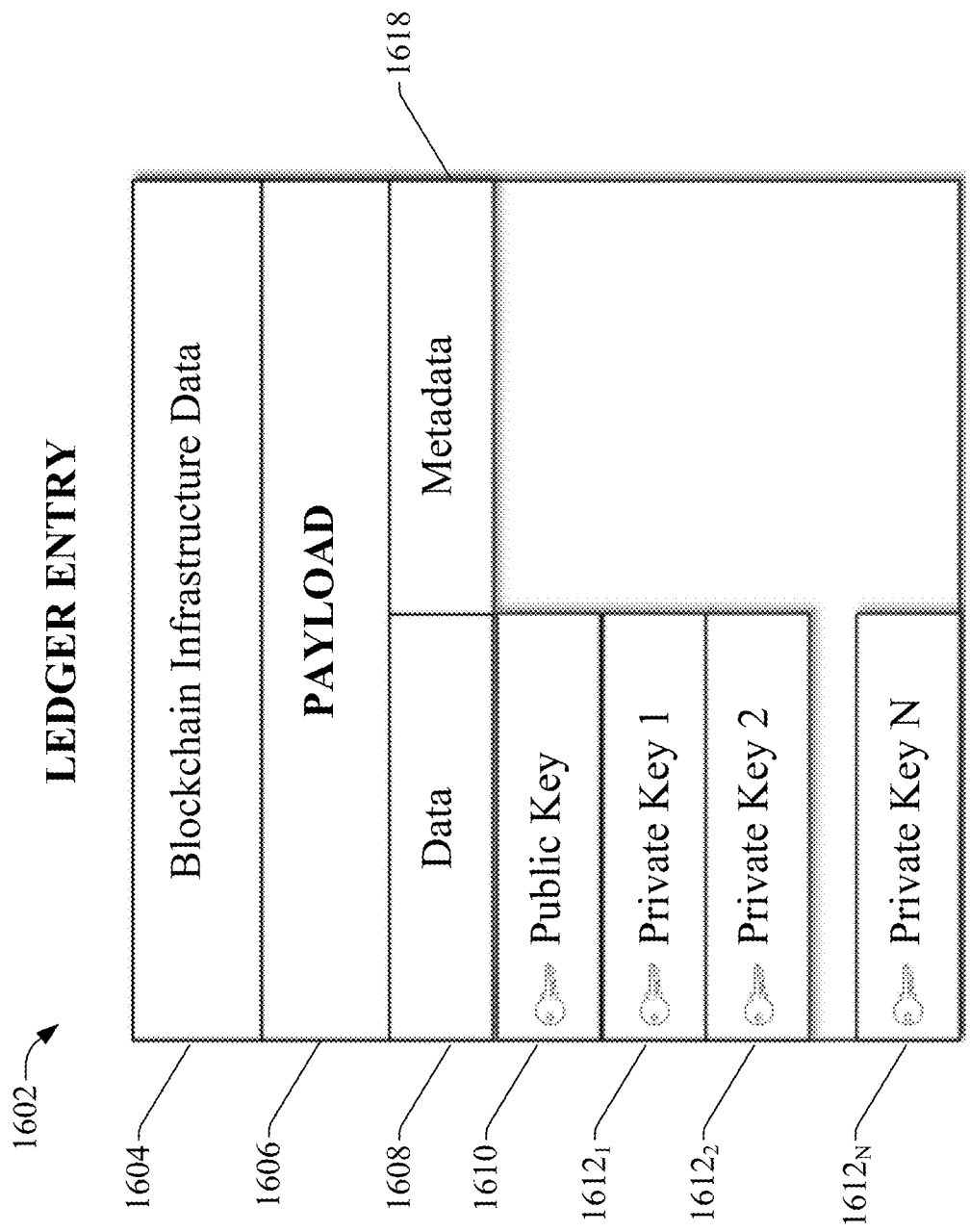
FIG. 16 is a diagram of an example ledger entry that can be added to an industrial device's ledger by a proof engine component.

FIG. 16 is a diagram of an example ledger entry 1602 that can be added to the industrial device's ledger 1126 by proof engine component 1104 according to one or more embodiments. Ledger entry 1602 can represent a single block of the blockchain, and can be stored as part of ledger 1126 in secure memory 1118. The ledger 1126 can be one of multiple copies of the ledger distributed among multiple devices or entities that participate in the industrial blockchain network (e.g., multiple blockchain-enabled industrial devices 1102 or other types of participating devices), with each device or entity maintaining its copy of the ledger 1126 based on validated transaction deltas generated by the device itself or received from other devices on the blockchain network.

Blockchain infrastructure data 1604 can include, but is not limited to, the hash of the previous block in the blockchain (e.g., previous hash 604 in FIG. 6), an identifier for the block represented by the ledger entry 1602 (e.g., index 614 in FIG. 6), timestamps for the transactions included in the block (e.g., timestamp 616 in FIG. 6), repudiation-related data, the Merkle tree root (e.g., root fingerprint 612), or other data relating to the blockchain infrastructure. The payload 1606 of the ledger entry can include transaction data 1608 as well as associated metadata 1618, which may be specific to the industrial applications that are leveraging the blockchain. For example, metadata 1618 can define data boundaries specifying who is permitted to access respective subsets of the transaction data 1608. In this regard, selected subsets of the data 1608 may be associated with respective user roles or user identities that are permitted to access and view those data subsets. In a related aspect, metadata 1618 can also define public/private boundaries for the data 1608. These boundaries can specify which sets of the data 1608 are to be made publicly accessible regardless of user roles or identities, and which sets are to be made privately accessible only to users within a given plant or industrial enterprise. In some embodiments, the data boundaries and public/private boundaries can be configured on the device 1102 using device configuration application 1208 (e.g., as one or more parameters of blockchain instruction 1202).

Ledger entry 1602 can also include a public key 1610 of the associated blockchain-enabled industrial device 1102 and one or more private keys 1612. These keys can be used to encrypt and decrypt information shared with other devices or entities on the blockchain network. In an example specific to industrial applications, an entity on the blockchain network can provide encrypted recipe data to a blockchain-enabled controller (e.g., controller 1210). The recipe data may be proprietary information defining parameters and/or executable instructions for manufacturing a particular product or batch. The recipe data can be encrypted by the sending entity's private key 1612 and decrypted by the receiving controller using the public key 1610 and the controller's own private key. Once decrypted, the receiving controller can execute the recipe to facilitate manufacture of the product. In this example scenario, the receiving controller can leverage the blockchain information to verify that the recipe is from a trusted source before executing, and to verify that the controller itself has been authorized to execute the recipe. Distribution and use of the recipe data can be subject to a smart contract implemented by the blockchain network, as will be described in more detail herein.

Figure 17:
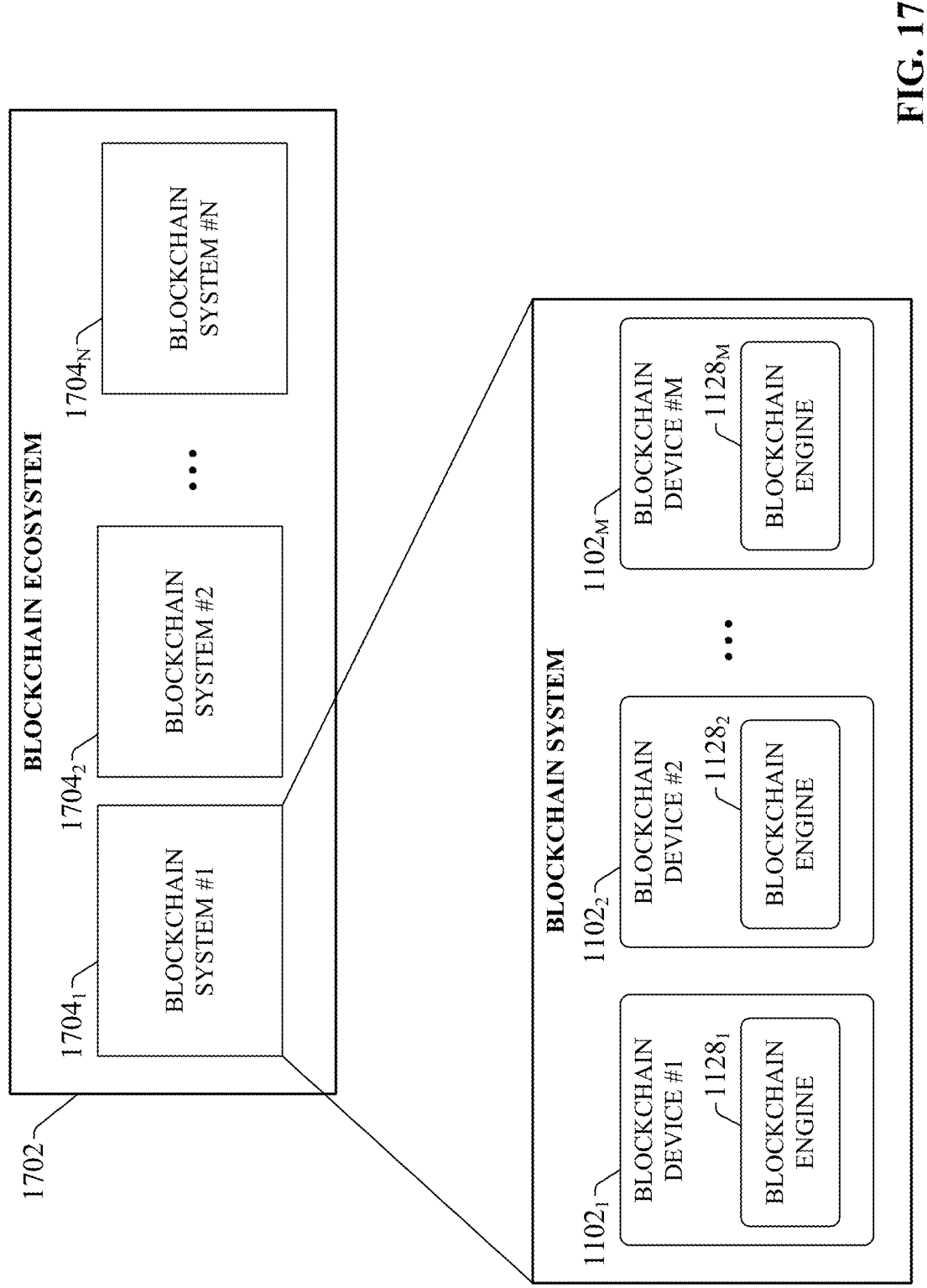
FIG. 17 is a diagram of an example industrial blockchain network architecture.

FIG. 17 is a diagram of an example industrial blockchain network architecture. In this example implementation, an industrial blockchain ecosystem 1702 can comprise multiple participating blockchain systems 1704. One or more of the participating blockchain systems 1704 can be industrial systems comprising multiple blockchain-enabled industrial devices 1102 (e.g., blockchain-enabled controllers 1210, HMI terminals, gateway devices, MES systems, motor drives, meters or other telemetry devices, sensors, ERP systems, data historians IIoT devices, etc.). The industrial blockchain ecosystem 1702 can span multiple geographic, organizational, and business boundaries. The blockchain systems 1704 can be owned by, or may represent, entities representing different disciplines within the manufacturing, supply, distribution, and/or retail chain, including but not limited to engineering and product development, product manufacturing, product testing, shipping, technical support, business and accounting, etc. Systems 1704 may be associated with producers and manufacturers, suppliers, sub-system suppliers (e.g., OEMs), designers and engineers, retailers, shippers, customers, end consumers, or other such entities.

In some embodiments, blockchain-enabled industrial devices 1102 can be added to this infrastructure in a substantially plug-and-play manner. For example, upon powerup, a blockchain-enabled industrial device 1102 can broadcast its identity as a blockchain-enabled device to other devices on the blockchain network, and can also detect other blockchain-enabled devices. Devices across all layers of a plant (control, middleware, enterprise, etc.) can share their identities, born-on certificates, firmware versions, and other such information with other peer devices on the blockchain system 1704 (and by extension the larger blockchain ecosystem 1702). These devices can be preconfigured to cooperate with other blockchain-enabled industrial devices as a consortium within the blockchain system 1704 to authenticate transactions using consensus mechanisms (e.g., practical byzantine fault tolerance, proof-of-work, proof-of-state, etc.).

To accommodate brownfield environments that include non-blockchain-capable devices, blockchain-enabled gateway devices can also be deployed. These gateway devices can allow legacy devices without integrated blockchain capability to proxy into the blockchain infrastructure. The gateway devices can create and link blocks of a blockchain based on data generated by the legacy devices and monitored by the gateway device via the network. In an example hybrid architecture, blocks can be created in an industrial controller while the blockchains that record transactions on the controller can reside within the gateway device. In another example architecture, an MES system can perform the blockchain creation and management functions for multiple monitored devices and systems within the plant. These proxy systems can synchronize blockchains from different sources, certify which chains are trusted, and perform other such blockchain management functions.

Figure 18:
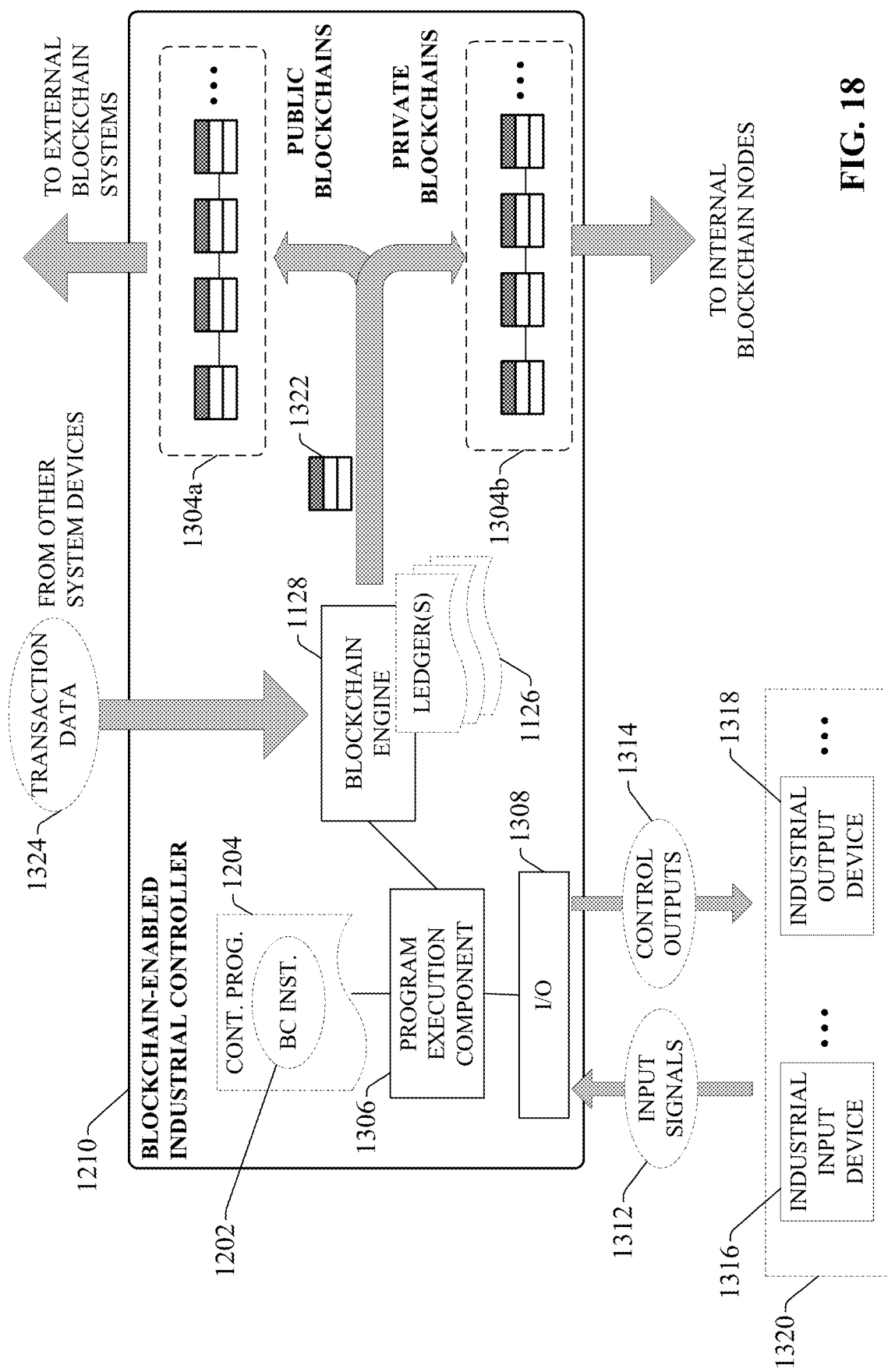
FIG. 18 is a diagram of an example blockchain-enabled industrial controller illustrating generation of public and private blockchains.

Since manufacturing and distribution chains can comprise multiple different entities having complex business interrelationships, each entity may wish to regulate access to the information shared with other entities within the chain. For example, a supplier entity that manufactures and provides parts used by another manufacturing entity for manufacture of its own products may wish to provide only a limited subset of its available blockchain data relating to manufacture of the part (e.g., results of quality tests, manufacturing time stamps, a source of materials used to manufacture the part, etc.), while withholding other proprietary manufacturing statistics generated during production of the part and recorded in a blockchain. Accordingly, blockchain-enabled industrial devices 1102 can be configured to generate multiple versions of a blockchain with different degrees of access permissions. FIG. 18 is a diagram of an example blockchain-enabled industrial controller 1210 illustrating generation of public and private blockchains. During runtime, one or more embodiments of blockchain-enabled industrial controller 1210 (or other blockchain-enabled industrial devices 1102) can be configured to create multiple versions of a blockchain to facilitate layered access to manufacturing data generated by the blockchain system within which the controller 1210 operates. This can include creating a public blockchain 1304*a* and a private blockchain 1304*b*, each of which comprises data that respective different sets of users or systems within the blockchain ecosystem 1702 are allowed to access. For example, the public blockchain 1304*a* may include publicly accessible part count or material source information that may be accessed by all blockchain systems 1704 within the ecosystem 1702, while the private blockchain 1304*b* may include proprietary recipe information that is to be kept private from the other systems 1704 within the ecosystem.

In some embodiments, users can identify which data items are to be included in each version of the blockchain 1304, as well as the scope of access to be assigned to each version of the blockchain 1304, via a device configuration interface (e.g., device configuration application 1208). In an example configuration technique, device configuration application 1208 may allow the user to define two or more blockchains to which transactions are to be added by the blockchain-enabled industrial controller 1210, as well as the scope of access to be to be assigned to each blockchain. The scope of access may be defined, for example, by identifying the devices, entities, or blockchain systems 1704 that are to be permitted access to the data recorded by each version of the blockchain. Once these various blockchain versions are defined, blockchain instructions 1202 can be added to the industrial control program 1204. The blockchain instructions 1202 can include instruction parameters 1212 that allow the user to select data items or control events (e.g., timed events, change-of-state events, alarm events etc.) that are to be considered transactions to be included in a blockchain, as well as a parameter that allows the user to select which of the defined versions of the blockchain 1304 the transaction is to be associated with. In another configuration example, a tag dialog can be invoked on the device configuration application 1208 that allows the user to select which data tags are to be made public so that other devices on the blockchain network can see the path.

Figure 19:
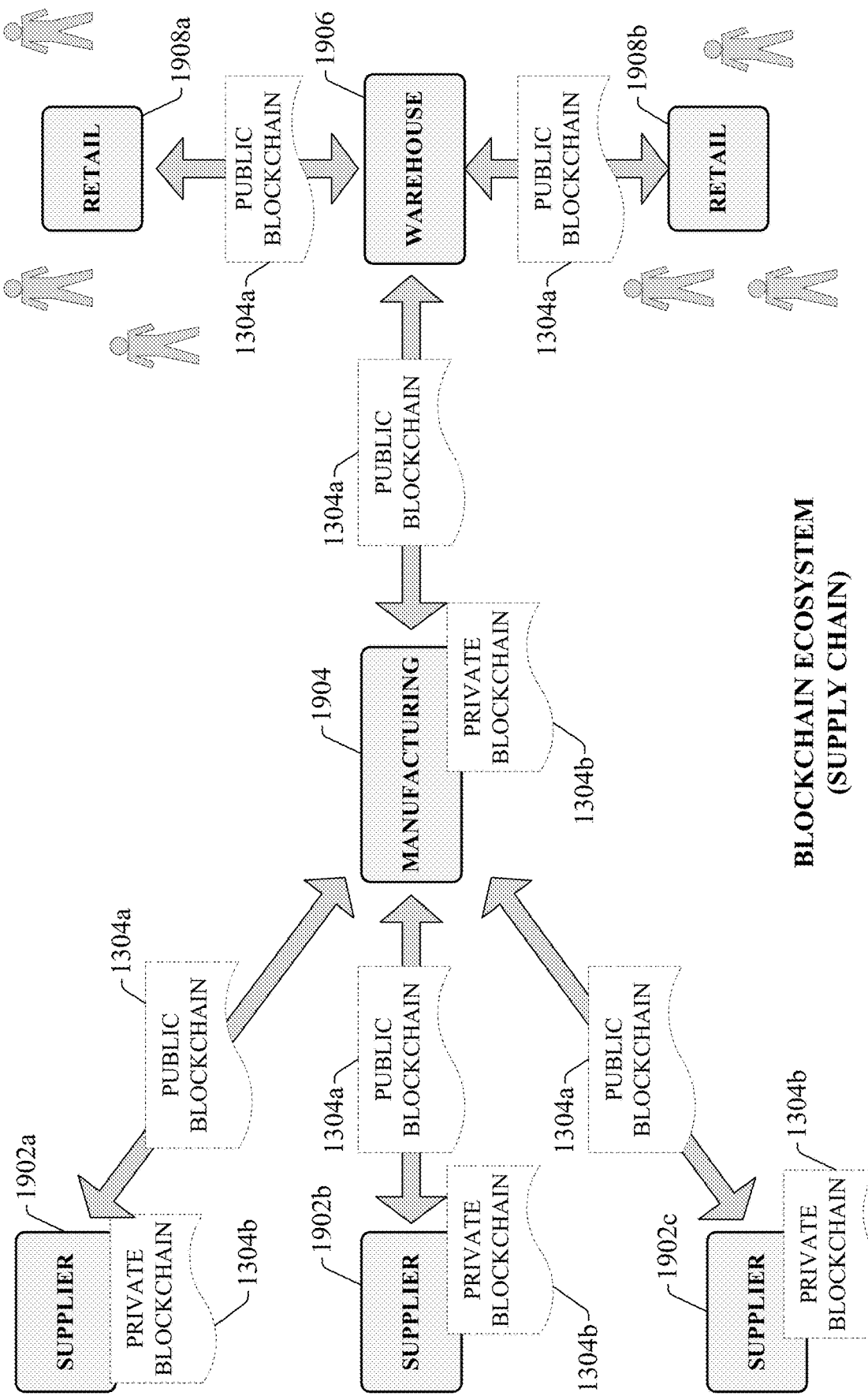
FIG. 19 is a diagram illustrating segregation of private and public blockchain information in an example industrial blockchain ecosystem.

FIG. 19 is a diagram illustrating segregation of private and public blockchain information in an example industrial blockchain ecosystem. The example ecosystem depicted in FIG. 19 comprises a number of blockchain systems associated with respective entities that participate in a manufacturing and distribution chain, including supplier entities 1902, a manufacturing entity 1904, a warehouse entity 1906, and retail entities 1908. Supplier entities 1902 may be manufacturing entities that provide parts or materials to manufacturing entity 1904 that manufactures a product using the provided parts or materials. One or more supplier entities 1902 may be OEMs that provide custom-built machines to the manufacturing entity 1904. Manufacturing entity 1904 may provide finished products to a warehouse 1906, which may be owned by the same industrial enterprise that owns the manufacturing entity 1904. Warehouse 1906 may distribute product to retail entities 1908. It is to be appreciated that the example industrial ecosystem depicted in FIG. 19 is only intended to be exemplary, and that an industrial blockchain ecosystem can comprise any collection of entities of various roles.

One or more of the blockchain systems that make up the ecosystem can maintain both private blockchains 1304*b* for internal use as well as public blockchains 1304*a* accessible to other participating entities in the blockchain ecosystem. Public and private industrial blockchains can be used within a blockchain ecosystem comprising several business entities of a supply chain for a variety of applications, including but not limited to tracking of machine performance and usage, tracking of products across a manufacturing facility or within a single industrial enterprise, tracking of products across the larger supply and distribution chain, distribution of proprietary recipe information, and product auditing. These example industrial blockchain applications are discussed in more detail below.

Blockchain-enabled industrial devices that support generation of public and private industrial blockchains can be used to track performance and usage of machines sold by OEMs to their customer manufacturing entities. In an example scenario, multiple machines built by different OEMs (e.g., one or more supplier entities 1902) can be deployed to an end user manufacturing site (manufacturing entity 1904). According to a vertical-specific example, manufacturing entity 1904 may be a beverage factory that runs a bottling line comprising fillers, sealers, conveyors, cartoners, and other machines. Some of the machines that make up the bottling line may be built and provided by one or more OEMs. During the machine build, blockchain-enabled industrial devices 1102 at the OEMs can generate private blockchains 1304*b* that record transactions and associated data associated with the machine building process that are to be accessible only by authorized devices and personnel associated with the OEM.

The OEM's blockchain-enabled industrial devices 1102 can also be configured to generate public blockchains 1304*a* that record publicly shared transaction data that can be accessed and viewed by other devices that participate in the blockchain ecosystem, including devices associated with the customer manufacturing entity 1904. This publicly accessible information can include, for example, results of factory acceptance tests (FATs) performed on the machine prior to shipping to the customer. Blockchain-enabled industrial devices that make up the machine, as well as blockchain-enabled test equipment used by the OEM, can capture these FAT results as transactions and record the results as validated blocks in the machine's public blockchain, which is shared with blockchain node devices at the manufacturing facility.

After the machines have been deployed at the manufacturing entity 1904, industrial blockchains can be used to track each machine's performance. For example, during bottling and filling operations at the manufacturing entity 1904, blockchain-enabled industrial devices 1102 at the facility can generate and update both private blockchains 1304*b* that record production data intended for internal use only, as well as public blockchains 1304*a* comprising transaction data that can be accessed and viewed by devices associated with the relevant OEM. The manufacturing entity's private blockchain data may comprise, for example, proprietary information relating to the product being manufactured within the manufacturing facility (e.g., recipe data, product order information, product quality check results, etc.), while the public blockchain data accessible by the OEM may include only performance statistics associated with the particular machine that was built and provided by the OEM (e.g., machine downtime statistics, alarm histories, etc.). This allows the OEMs to track performance of their own custom-built machines without being privy to the manufacturing entity's proprietary manufacturing data or information regarding other OEMs' machines. If desired, the blockchain-enabled industrial devices 1102 that make up the various machines of a production line or facility can be configured to maintain separate private blockchains for each OEM, so that performance of machines provided by different OEMs can be compared by the plant owner.

This selective sharing of blockchain data can also be used to generate a reliable tamper-proof ledger of machine usage statistics, which can be used in connection with subscription-based models of machine usage. For example, rather than purchasing a machine from an OEM, the manufacturing entity 1904 may establish a subscription-based contract with the OEM to use the machine at the manufacturing facility and to pay the OEM based on usage (e.g., based on an amount of monthly run-time, product count, power cycles, energy consumption, etc.). In some implementations, terms of this machine subscription service can be enforced by a smart contract defined for the blockchain ecosystem comprising the manufacturing entity 1904 and the OEM (supplier entity 1902). During runtime, blockchain-enabled industrial devices 1102—which can include both devices of the machine itself (e.g., industrial controllers, telemetry devices, power meters, drives, etc.) as well as other industrial devices or systems owned by the plant (e.g., power meters, ERP systems, etc.)—can track and record usage statistics for the machine as a tamper-proof blockchain that is shared with blockchain node devices at the OEM, eliminating the possibility of disputes between the manufacturer and OEM regarding actual machine usage.

Usage and/or status data recorded in the blockchain can also be monitored to determine when components of the machine should be replaced. For example, the smart contract can include provisions for the OEM to replace certain machine components or devices after a defined number of production cycles (or based on another time-based or event-based criterion, such as total energy consumption, part count, downtime or alarm frequency, a KPI setpoint, etc.). In response to a transaction indicating that the part replacement event has occurred, one or more systems within the blockchain ecosystem (e.g. system 2106 described below in connection with FIG. 21, or another system) can automatically initiate procedures for verifiably purchasing and delivering the replacement component (e.g., generating a purchase order, submitting the order to a vendor, scheduling an on-site visit by the OEM to replace the component, etc.). Similar to techniques described above in connection with FIG. 8, some embodiments of blockchain-enabled industrial devices 1102 may require submission of processing "fees" (e.g., Ether or "gas") in exchange for execution of smart contract logic on relevant transactions.

An example workflow for facilitating device replacement within the context of an OEM service agreement is now described. In an example scenario, an OEM may build a custom machine for a manufacturing entity. Typically, the machine will comprise the controlled mechanical system as well as the electrical and control system that distributes power to the machine components and facilitates automated control of the machine. The control system is generally housed in a control cabinet and can include a number of industrial control devices, including but not limited to one or more industrial controllers, motor drives (e.g., variable frequency drives), or other such industrial devices. In this example, the industrial control devices are blockchain-enabled devices.

During the building phase at the OEM facility, verifiable, unique identities of the machine components used in the machine assembly are recorded in the ledger of a public blockchain (similar to public blockhains 1304*a* illustrated in FIG. 19) stored on one or more of the industrial control devices to be shipped with the machine. A unique, verifiable identity for the machine itself is also recorded in the public blockchain ledger. Since the industrial controller will typically execute a custom control program or application developed by the OEM, the public ledger will also include a verifiable record of this control application. This record of the control application may be signed by the OEM's private key. Additionally, records of certain vendor-specific components used in the machine can be recorded in the public ledger. For example, the firmware version currently installed on the industrial controller or another industrial device in the machine's control cabinet may be recorded in the public ledger and signed by the vendor's private key.

In accordance with a contractual agreement between the OEM and the manufacturing entity (the purchaser), the OEM agrees to replace one or more specified component parts of the machine after completion of a defined number of machine operating cycles. The number of operating cycles that is to trigger a part replacement is defined on at least one of the machine's control devices (e.g., the industrial controller in the present example).

During operation at the manufacturing entity's facility, the blockchain-enabled industrial controller tracks a number of production statistics, including an accumulated number of operating cycles performed by the machine, an accumulated amount of time that the machine has run, a number of parts produced by the machine, etc. The industrial devices of the machine's control cabinet record this production data in the public blockchain ledger, signing the production data using the manufacturing entity's private key. The control devices also record modifications made to the machine or its associated industrial devices by the manufacturing entity. For example, changes made to the firmware of the industrial controller or other control devices as a result of reimaging or patching are recorded in the public blockchain ledger, as are modifications made to the OEM-developed control program or application executed on the industrial controller.

In response to determining that information stored in the public ledger satisfies a criterion (e.g., a criterion defined in a smart contract) indicating that the OEM is contractually obliged to perform a component replacement or other maintenance action on the machine (e.g., in response to execution of a defined number of machine cycles, when the accumulated machine run time exceeds a defined number of operating hours, when the machine has produced a defined number of parts, etc.), the block chain engine in the industrial controller signs, on behalf of the owner, a verifiable and contractually binding component replacement order as a transaction in the public blockchain.

Since the OEM has access to data stored in the public blockchain, the OEM receives and verifies the component replacement order, and in response ships the necessary machine component to the manufacturing entity. The manufacturing entity installs the replacement component and records a signed conformation of the replacement in the public blockchain ledger. The OEM can use this verified transaction to initiate payment processing. Using this system, the replacement component, the vendor-specific device firmware, and the OEM-specific application are all verifiably tracked in the public blockchain ledger. The current state reflected in the public blockchain reflects the authorized production cycle count, which is viewable by both the OEM and the end user. For subscription-based operation of the machine, the OEM can authorize the production cycle count in the public blockchain ledger based on payment and agreement. The end-user can also set the criteria for the machine to automatically renew additional production authorization at defined thresholds.

In addition to the information recorded in the public blockchain ledger as described above, the machine's control devices also maintain a private blockchain ledger (e.g., private blockchains 1304b in FIG. 19) comprising data that can be accessed only by the manufacturing entity. This can include smart contracts for the authorization of machine downtime, approval of new firmware versions, and approval of new versions of the control application. These authorizations can be performed by the blockchain engines of the industrial devices without relying on a human entity to tell the machine to do so.

The private blockchain for the machine can also include records of maintenance operations performed on the machine that do not affect the OEM contract (e.g., maintenance operations that do not involve modifying the OEM's control application, replacing components that the OEM is obliged to replace, etc.). These maintenance records can also include records of which personnel performed the maintenance operation and when the maintenance operations were performed.

The private blockchain can also include machine operation statistics that do not affect the OEM contract. Such production information can include, for example, identifications of plant employees who operated the machine during each shift, stoppage times during each shift, total machine runtime for each shift, etc. Other information that can be stored on in the private blockchain can include, but is not limited to, internal manufacturing information such as part identities (e.g., chip serial numbers used on an assembled printed circuit board), part defect statistics, improper machine operations, etc.

Other types of entities involved in purchase or leasing of a machine from an OEM can also be included as participants in the industrial blockchain ecosystem. For example, as part of the process of installing a new production line, plant owners may obtain financing from a bank or purchase design services from an engineering firm. Like the OEM, these other entities may be paid by the manufacturing entity 1904 in increments; e.g., based on project milestones or on a periodic basis. Public industrial blockchains generated by devices 1102 can allow all parties to see the progression of the machine build project as the machine moves toward operation, with states of the project being tracked and recorded in the blockchain. Access to the data recorded by the blockchain can be regulated based on the role of the entity. For example, the OEM may be interested primarily in production numbers for billing purposes in a subscription-based contract, while designers may be afforded access to more granular device-level performance data. The diverse entities involved in the machine's lifecycle (e.g., designer, OEM, manufacturer, financial institution, etc.) can each be afforded layered levels of access to blockchain data generated for the machine at all stages of its lifecycle (e.g., design, commission, operation, and maintenance).

The public and private industrial blockchains can also be used to improve technical support services offered by the OEM or by other support entities. For example, if a machine downtime event or other performance issue is reported by the manufacturing entity 1904, the blockchain transactions can be examined by the OEM or other technical support entity to determine the state of the customer's machine at the time of the reported event. Information encoded in the blockchain that may be leveraged by the technical support entity can include, but is not limited to, device identifiers, device configuration data, machine states, etc. The customer's shared blockchain can also log unscheduled maintenance events, skipped lock out/tag out events, or other operator actions that may be useful to technical support entities when tracking a root cause of a reported performance issue. As in previous examples, blockchain-enabled industrial devices 1102 can maintain public blockchains that record transaction data accessible to outside technical support entities, while separately maintaining a private blockchain that records proprietary information that is inaccessible to the technical support entity. The public blockchain can be made accessible to all repair entities that are trusted members of the industrial blockchain ecosystem.

In a related aspect, blockchains generated for the machine (by the blockchain-enabled devices that make up the machine as well as by other peripheral systems such as ERP and MES systems) can be leveraged to perform machine warranty and maintenance tracking. For example, the machine's blockchain can record usage and repair information on the manufacturing entity's plant intranet. This information can include, for example, dates and times at which a maintenance operation was performed, identities of any components or devices that were replaced or reprogrammed, dates and times of lock out/tag out procedures that were followed in connection with a maintenance action, identities of the personnel who performed the maintenance action, etc. The blockchain that records this maintenance information can be maintained on distributed devices within the manufacturing entity's plant intranet, such that any single device on the plant's blockchain network can query the blockchain to obtain maintenance log information for the machine. This creates a tamper-proof record of maintenance operations that can be accessed without the need to log into a data historian. Some of this maintenance and operational information can be maintained on a private blockchain that is only accessible by devices on the plant's own intranet. Additionally, blockchain-enabled devices 1102 within the plant can generate a public version of the machine's blockchain that includes warranty-related information that is accessible by outside support entities (e.g., OEMs or other technical support entities) who have a business interest in the information. Information in this public version of the blockchain can include, for example, operating hours, power cycles, identities of devices added to the machine (which may be unauthorized devices), etc. This public version of the machine's blockchain can be viewed by outside support entities to validate claims made by the machine owner regarding internal maintenance actions performed on the machine or the machine's operational history.

The techniques described above regarding the use of industrial blockchains to track an OEM-provided machine across its lifecycle can also be applied to parts, sub-assemblies, or materials provided by supplier entities 1902 to a manufacturing entity 1904. For example, the blockchain systems that make up an example industrial blockchain ecosystem may be geographically distributed across multiple businesses that together form an integrated supply chain for a product. In an automotive example, sub-assemblies for a car produced by an automotive facility (the manufacturing entity 1904 in this example) may be manufactured by respective sub-assembly suppliers (supplier entities 1902). In addition to generating private blockchains 1304b that record proprietary manufacturing data generated in connection with the fabrication of the sub-assemblies, blockchain-enabled industrial devices 1102 at the supplier entities 1902 can generate public blockchains 1304a that record information regarding manufacture of the sub-assemblies permitted to be shared with the manufacturing entity 1904. These public blockchains 1304 are accessible by devices at the manufacturing entity 1904, and only comprise a subset of available sub-assembly manufacturing information that the supplier is contractually obligated to provide to the manufacturer. This public blockchain information can be incorporated into the manufacturer's own information tracking for the fully assembled and sold vehicles.

Also, similar to the OEM example described above, public blockchains 1304a that record transactions at the manufacturing entity 1904 can be used to share a selected subset of performance or test data for these sub-assemblies with their associated supplier entities 1902, allowing the sub-assembly suppliers to track the performance of their own sub-assemblies after the sub-assemblies have been sent to the manufacturer.

Blockchain-enabled industrial devices 1102 can also be configured to support the use of blockchains in connection with distribution of proprietary recipes between supply chain entities and execution of those recipes on industrial controllers. A recipe may comprise a set of executable instructions and/or parameter values for manufacturing a specific type of product or material. When installed and executed on an industrial controller, the recipe instructs the controller how to produce the specified product or material. While many recipes are designed by engineers within the plant facility that produces the product, in some cases the recipe may be a proprietary set of instructions and/or parameters designed and distributed by an outside entity. In an example scenario, an OEM may design and distribute recipes to manufacturing customers that have purchased or leased the OEM's proprietary equipment, so that the OEM's recipe can be executed on the equipment in connection with manufacturing a particular type of product. In another example, a manufacturing entity may provide a recipe to a supplier entity to ensure that component parts or materials manufactured by the supplier for the manufacturing entity meet specification requirements. The provider of the recipe may wish to keep the details of the recipe hidden from the receiving entities that utilize the recipe to produce a batch of product. From the opposite perspective, the entity that receives and installs the recipe on their equipment requires verification that the recipe being installed is from a trustworthy source.

Accordingly, industrial blockchains can be used to ensure to the manufacturing entity that a recipe is from a trusted source and to track execution of the recipe on the end manufacturing entity's equipment. The blockchain can also track changes made to the recipe itself. In an example scenario, a recipe holder—such as a supplier entity that develops and provides recipes for execution at partner facilities—can deliver a signed, verifiable recipe to the recipe user (the manufacturing entity that will execute the recipe on one or more industrial controllers to yield a product or material in accordance with specifications encoded in the recipe). The recipe may be contractually bound to produce a specified number of units or batches, or may have an associated timed expiration beyond which production rights afforded to the recipe user expire. The recipe to be distributed to the supplier entity can be embedded in a blockchain, and a public key infrastructure (PKI) system (implemented by the cryptographic components 1106 of the blockchain-enabled industrial devices 1102 and using private keys 1122 and public keys 1124) can be used to ensure that the recipe is executed only on a specified target device (e.g., a specified industrial controller 1210). For example, a sending device can wrap the recipe with a private key to yield an encrypted recipe, and the cryptographic component 1106 of the receiving controller (e.g., controller 1210) on which the recipe is to be executed can unwrap the encrypted recipe with its own private key 1122 using the public key. Blockchain-enabled industrial controllers 1210 at the recipe user's facility can be configured to leverage the blockchain information to verify that the recipe is from a trusted source (the recipe holder) before executing, and to verify that the controller itself has been authorized to execute the recipe. Controllers 1210 can also execute the recipe without permitting the recipe holder to view the specifics of the recipe. In this regard, the blockchain-enabled system may place intentionally obfuscated ingredient orders through the recipe maker's supply chain.

In some embodiments, a licensed contract to use the recipe can also be embedded (e.g., as a smart contract enforced by industrial devices 1102 that make up the industrial blockchain ecosystem) to prevent execution of the recipe on the recipient's controller after an agreed number of parts have been produced using the recipe (or based on another termination criterion, such as a specified expiratory date, consumption of a specified amount of power by the controlled system, etc.). Geotagging can also be used to verify that the recipe is being executed at an agreed location (e.g., at a specified plant facility). In such embodiments, the recipe can be made aware of its location based on geotagging functionality of the industrial device 1102 on which the recipe is executed, and will only allow execution by the industrial device 1102 if the geotagged location corresponds to the agreed location.

In such recipe sharing systems, when the recipe is delivered, the public ledger of the industrial blockchain—which can be accessed by both the recipe owner and the recipe maker—may include the signed and verified recipe, the authorized number of production units or batches and/or the authorized period of production. During production, the public ledger can also record the elapsed number of units produced and/or the elapsed runtime for the recipe. At the recipe maker's facility, blockchain-enabled industrial devices are configured to validate the recipe, to interpret the obfuscated recipe, to take the production order, and to determine the quantities and ingredients needed to execute the recipe. The blockchain-enabled devices can also control the production process by placing ingredient orders through the supply chain to the recipe maker. Also, during production, the blockchain-enabled device 1102 can also maintain a private blockchain ledger that is visible only to the recipe maker, and includes proprietary recipe operations information, including but not limited to batches of different recipes for different recipe owners, private end user production statistics not covered by the recipe contract, private machine operational information (e.g., identities of plant personnel who operated the machine, runtime statistics for the machine, downtime statistics for the machine, etc.), internal manufacturing information, defect tracking statistics, and other such proprietary information.

In general, selective access to public and private industrial blockchains can be granularized as needed. For example, fully public industrial blockchains can render their associated transaction data available to all entities and devices that make up the blockchain ecosystem. Blockchain-enabled industrial devices 1102 can also support semi-public industrial blockchains that allow transaction data to be shared only with a specified subset of all entities within the industrial blockchain ecosystem (e.g., as in the OEM and sub-assembly supplier examples described above, in which the public blockchains are only made accessible to the relevant OEM or supplier). Similarly, private blockchains 1304b that only share transaction data among devices within a given industrial facility or industrial enterprise (e.g., among devices on a plant's intranet) may be accessed according to a layered access permission model. For example, some private industrial blockchains may be shared among all participating devices on a plant's intranet, while other private industrial blockchains may be shared only by a subset of devices that are associated with a given production area or production line.

Figure 20:
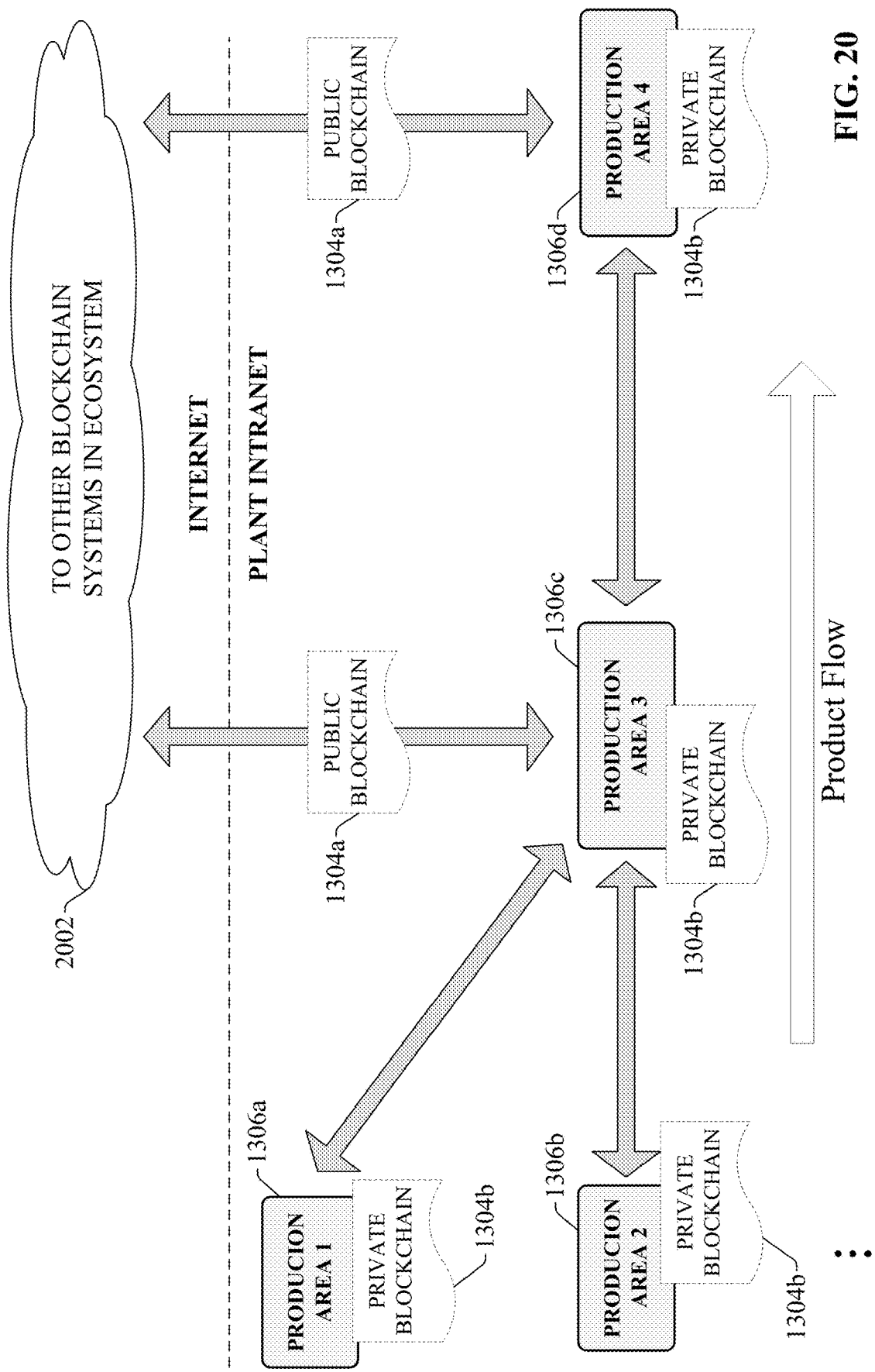
FIG. 20 is a diagram illustrating generation of blockchain data within a plant intranet.

Public and private industrial blockchains can also be used to track manufactured products through a manufacturing facility or across multiple facilities of an industrial enterprise. FIG. 20 is a diagram illustrating generation of blockchain data within a plant intranet. The manufacturing facility depicted in FIG. 20 may correspond, for example, to manufacturing entity 1904 or one of the supplier entities 1902 depicted in the supply chain ecosystem of FIG. 19. In the illustrated example plant architecture, a number of production areas 1306 within a manufacturing facility—including Production Area 1 and Production Area 2 —produce component parts or materials that are provided to Production Area 3, which assembles the parts or materials received from those upstream production areas. During runtime, blockchain-enabled industrial devices 1102 that operate within Production Areas 1 and 2 (the supplier production areas) bundle transactions generated within their respective production areas in connection with production of the component parts or materials, generate and validate blocks of these transactions (e.g., collaboratively with other blockchain-enabled industrial devices 1102 within the respective production areas using consensus-based validation techniques such as practical *byzantine* fault tolerance, proof-of-work, or proof-of-state), and add the validated blocks to a private blockchain 1304b that is only accessible to participating devices on the plant's intranet (and not to other entities of the larger blockchain ecosystem).

Component parts or materials produced by Production Areas 1 and 2 are conveyed to Production Area 3 for assembly into either a finalized product or a sub-assembly of the final product. The blockchain-enabled industrial controller 1210 (or another blockchain-enabled industrial device 1102) that controls the industrial assets in Production Area 3 can link the blockchains generated by Production Areas 1 and 2, which are associated with the respective component parts generated in those production areas. In an example system, the plant may be a bottling facility, and three upstream production areas (including Production Areas 1 and 2) may respectively produce a bottle, a cap, and a label which are then assembled at Production Area 3. When a received bottle, cap, and label are assembled at Production Area 3, the blockchain-enabled industrial controller 1210 that monitors and controls the Production Area 3 automation system can synchronize and link the blockchains associated with each of the components that were generated at the respective upstream production areas, yielding a composite blockchain for the assembled product (a capped and labeled bottle). The devices of Production Area 3 can also expand this composite blockchain by adding records of its own operations performed on the assembled product. As part of the controller's initial configuration, a ledger design tool (e.g., a tool of device configuration application 1208) can allow the user to define what information is to be included in the ledger (e.g., ledger 1126), and to select which automation object instantiated in the controller 1210 is to be used as the ledger root.

In some implementation, each assembled product can be represented by a new block in the industrial blockchain, with each block's transaction data comprising production statistics for the product. Example statistics that can be archived in the blockchain can include, but are not limited to, a part identifier (e.g. a VIN number of an assembled vehicle, a serial number of a capped and labeled bottle, etc.), a timestamp indicating a time of assembly or manufacture, measured quality metrics (e.g., leak test results, cap or bolt torque data, etc.), machine states or telemetric data at the time the product was assembled (e.g., oven temperatures, moisture levels, water or air pressures, etc.), or other such information that can be married to a unit or batch of product. In some implementations, each operation performed on the unit of product during its progress through the production process can be represented as a transaction within the industrial blockchain.

This technique for linking industrial blockchains associated with component parts of a final assembled product can be extended to include parts, sub-assemblies, or materials received from outside supplier entities, and more generally to traversal of products across the entire supply chain (e.g., the supply chain depicted in FIG. 19). In such scenarios, supplier-provided components (e.g., batches of material, sub-assemblies, component parts, etc.) can be received at the manufacturing facility together with blockchains that record transactions associated with production of the components at the supplier sites. One or more blockchain-enabled industrial devices 1102 at the manufacturing facility can link these blockchains into a composite blockchain, adding its own transactions to the blockchain as new blocks as the received components are further assembled and/or processed. When the product leaves the manufacturing facility and arrives at the next entity in the supply chain (e.g., another manufacturing entity, a warehouse entity, a shipping entity, a retailer, etc.), any new transactions performed on the product at the next entity are added to the existing blockchain data associated with the product (including synchronized blockchain data associated with any of the product's sub-assemblies or component parts), either by adding new blocks to the existing blockchain or by synchronizing and linking the existing blockchain for the product with a new blockchain generated at the next entity to capture new transactions carried out on the product. In addition to manufacturing transactions, the composite industrial blockchain associated with the unit of product can also record product handling and location tracking information (e.g., warehouse shipping information) as well as business-related information (e.g., order information, purchase information, etc.). All of these diverse transactions are validated by a consortium of devices within the industrial blockchain system or ecosystem using suitable consensus-based validation techniques.

In another example configuration, an industrial blockchain generated for a component part to be assembled with other parts into a final product can include, in addition to production statistics for the component part, provenance information that defines, as immutable and verified blockchain data, an origin or source of the component part. This provenance information can comprise, for example, one or more of an identity of a vendor or supplier of the component part, a part identifier, identifies of other entities within the supply chain through which the part has traversed, a date of the part's manufacture, a cost of the part, or other such information. The part's blockchain can also include part characteristic information about the part, including but not limited to a type of the part, a color of the part, a composition of the part, a size of the part, or other such information.

One or both of the provenance information or the part characteristic information stored in the component part's blockchain can be leveraged by industrial devices at the manufacturing site to verify, prior to assembly of the part into the final product, that the correct part is being incorporated into the final product. For example, with reference to the example production facility depicted in FIG. 20, when component parts are received at Production Area 3 for assembly into either a sub-assembly or a final product, one or more industrial devices at Production Area 3 can be configured to incorporate a component part into a product assembly or sub-assembly only if the provenance and/or part characteristic information stored in the component part's blockchain satisfies one or more defined criteria. These criteria can define, for example, authorized sources or dates of manufacture of the component part (which can be verified based on reference to the provenance information); correct part types, sizes, and/or colors (which can be verified based on reference to the part characteristic information), or other such criteria. During operation, when component parts are received at Production Area 3 for assembly into either a sub-assembly or a final product, the one or more industrial devices will reference the provenance and/or part characteristic data recorded in the parts' respective blockchains, determine whether the recorded information satisfies the defined assembly criteria, and proceed to incorporate each component part into the assembly only if the provenance and/or part characteristic information for the part satisfies the criteria. When the assembly is complete, the industrial devices can merge the provenance information for the component parts that were used in the assembly to yield composite as-built provenance information for the assembly as a whole, and record this as-built provenance information in a blockchain associated with the assembly.

In some implementations of this system, industrial devices that process a given component part can obtain some or all of the provenance information or part characteristic information for the part from a radio-frequency identifier (RFID) tag attached to or otherwise associated with the part. In such embodiments, items of provenance and/or part characteristic data can be written to the RFID tag associated with the part at certain points during traversal of the part through the supply chain. This information can subsequently be read from the part's RFID tag by one or more RFID readers and added to the part's blockchain as a transaction.

Systems that support aggregation of component part blockchains into aggregate blockchains associated with a sub-assembly or final assembled product, as described above, can also leverage these aggregate assembly blockchains in connection with warranty returns. For example, a manufacturing entity that produces and ships a sub-assembly or assembled product can store, as immutable composite blockchains, assembly information identifying the various component parts that were used in the assembled product. This assembly information can include some or all of the provenance and/or part characteristic data described above. This composite assembly information can subsequently be checked to determine whether an assembled product that has been returned for repairs or replacement under warranty has been altered or tampered with by the customer. In the case of assembled products comprising RFID-tagged parts, this determination can be made by reading RFID data from the component parts that make up the returned product to determine the as-returned composition of the product, and comparing this as-returned composition with the as-built composition recorded in the assembled product's blockchain. An RFID tag reader interfaced to one or more sources of the plant's blockchain data can be configured to make this comparison and to output information identifying anomalous parts or part replacements present in the as-returned composition. Depending on the terms of the warranty, the manufacturing entity may choose to either deny or proceed with the repair or replacement. For example, the warranty may dictate replacement of one or more specified component parts by the end user is permitted and does not violate the terms of the warranty. If the system determines that only such component parts have been replaced, the replacement or repair may be permitted. Alternatively, if the system determines that a component part replaced by the end user violates the terms of the warranty, the replacement or repair may be denied.

To minimize consumption of storage space, some embodiments of blockchain-enabled industrial devices 1102 can allow users to configure selected blockchains for a product to be transient rather than persistent, such that the blockchains will be deleted after an expiration time or on an event basis. For example, a blockchain generated for a particular item or batch of product may be configured to delete itself from all devices across which the blockchain is distributed after a defined criterion has been satisfied. For example, the industrial blockchain associated with an item of perishable product can be configured to delete itself after an elapse of a time duration after which it can be assumed that the product was consumed (e.g., three months after the product is sold, as determined based on credit card transaction data). In another example, the blockchain associated with a product may be configured to delete itself after the product leaves the manufacturing facility if the blockchain's data only has utility internally during the manufacturing process. Automatic deletion of an industrial blockchain will extend back to the blockchain's root to ensure that blockchain's data can still be validated. Alternatively, when the deletion event occurs, the blocks of the blockchain can be maintained while the associated transaction data is deleted, or a new root can be set such that a later portion of the blockchain remains while an earlier portion is deleted. The portion of the blockchain that is deleted can be dependent on the blockchain's hierarchy. In another example configuration, a blockchain's expiration definition can specify that only a selected subset of participating devices—those not requiring the blockchain's data—may delete the blockchain in response to the deletion event, while other devices may maintain the blockchain. In an example scenario, a blockchain-enabled industrial controller may not need a product's blockchain after the product leaves the production area and deletes the blockchain accordingly (e.g., in response to recorded shipping information that indicates the product has left the facility), while an MES system may save the blockchain for archival purposes.

Since a product may pass through several different supply chain entities, some embodiments of blockchain-enabled industrial devices 1102 can include contingency features for managing gaps within the product's blockchain. These gaps can occur, for example, when the product leaves one facility and is transported to another location in the chain via a truck with no communication capabilities. In some embodiments, artificial intelligence or other types of inference can be used to infer the missing information. When the product reaches another verified entity within the supply chain, historical information can be leveraged to interpolate and confirm that the product is back under control of an authenticated entity.

In addition to the private blockchains 1304b, the blockchain-enabled industrial devices 1102 at the manufacturing facility can also generate public blockchains 1304a that record, as transactions, manufacturing statistics for each unit of product that is to be shared with other devices on the larger industrial blockchain ecosystem. These public industrial blockchains 1304a can be distributed across devices at the industrial facility and devices associated with other entities in the ecosystem (e.g., a supply chain), which are connected via a public or semi-public network 2002 such as the internet or a public or private cloud platform. Public industrial blockchains 1304a can include blockchains that are to be accessible by all participants in the blockchain ecosystem (i.e., fully public blockchains) as well as semi-public blockchains that are to be accessible only by selected entities and/or devices in the ecosystem. In this regard, blockchain-enabled industrial devices 1102 can be configured to generate as many different tiers of blockchains as desired, with each blockchain defined and configured to permit access by a selected set of entities.

In an example scenario, the manufacturing facility may manufacture products for multiple different customers (e.g., a plant that produces custom computer chips for different computer manufacturers). Accordingly, blockchain-enabled industrial devices 1102 used to manufacture the products may be configured to create a proprietary customer-specific blockchain for each customer, which each customer-specific blockchain comprises transaction data associated with that customer's product. In such implementations, the blockchain-enabled devices 1102 can create a new blockchain for each customer-specific manufacturing run. That is, after a production line switches operation from production of a batch of product for a first customer to a new batch for a second customer, the blockchain-enabled devices will cease updating the previous blockchain associated with the first customer's product and begin a new blockchain for the second customer to record transactions associated with the new product run. In this way, industrial devices participating in the blockchain system can segregate industrial blockchains according to customer.

In addition to maintaining separate blockchains for a given product or machine, with each blockchain having different access permissions, some embodiments of blockchain-enabled industrial devices 1102 can be configured to manage selective access to a given single blockchain. For example, an industrial blockchain can be generated that allows the blockchain's hash information to be made public to all entities within the ecosystem while keeping the blockchain's transaction data private. This can allow a manufacturing entity to reassure outside parties that the plant's data is authentic without providing visibility into the data itself (which may be proprietary). In an example scenario, an OEM may vouch for a state of a machine or program, which can be confirmed by checking the publicly accessible hash values of the machine's blockchain. This hash information can be made available without allowing private information about the machine state itself to be viewed by entities outside of the OEM.

To ensure trust relationships between blockchain-enabled industrial devices 1102 that make up an ecosystem 1702 of industrial blockchain systems 1704 (e.g., a supply and/or distribution chain), a trusted entity can certify device vendors that produce blockchain-enabled industrial devices 1102 and that participate in the supply chain, creating a supply chain with signed participation. In general, blockchain-enabled industrial devices 1102 are configured to authenticate transactions (e.g., using digital fingerprinting or by other authentication means) within the global supply chain workflow, including transactions that occur within the manufacturing facility in which the transactions occur (e.g., transaction in which the industrial devices 1102 are directly involved) as well as transactions that originate elsewhere in the supply chain (the industrial blockchain ecosystem) as part of a consortium comprising multiple industrial devices 1102. As an example consensus criterion, a rule can be defined stating that at least 20 devices on the blockchain network must agree that a transaction is valid before adding the transaction to a block.

The use of blockchains throughout the supply chain, as described in previous examples, can also allow a consortium of entities to authenticate standards for a product from many levels. For example, different entities within an industrial blockchain ecosystem can certify that a product meets a defined standard in terms of safety, labor practices, equipment used to manufacture the product, certified plants at which the product was manufactured, etc. The devices making up the consortium can act as a mesh network, where different sub-entities can confirm that the defined standards are being met across multiple supply chain jurisdictions (e.g., that a product is organic, that a material used in the product is authentic, etc.). In an example scenario, to record that a product has been authentically produced by a certified plant and/or using legitimate equipment (e.g., certified machines or other approved industrial devices), the blockchain-enabled industrial devices that were involved in producing the product can record, as a transaction in the product's blockchain, validated identities of the blockchain-enabled industrial devices themselves. In some embodiments, this recorded device identity information can include both identity information for the device itself (e.g., model number, unique serial number, etc.) as well as an identity of the plant entity that owns the equipment. Recording this information as a blockchain transaction creates a tamper-proof, verifiable authentication that the product was produced by approved or certified equipment. In this way, the use of industrial blockchains can simplify the process of tracking compliance paperwork through multiple jurisdictions and ensure the authenticity of such claims.

Industrial blockchains can also be used to authenticate carbon credits by tracking how much carbon dioxide was used to manufacture a product. In an example implementation, all carbon dioxide consumption can be aggregated by the blockchain-enabled devices 1102 and added as a validated element of the blockchain. This trusted and validated consumption data can be submitted to appropriate regulatory agencies for carbon dioxide credits.

Both within the context of a single manufacturing facility (e.g., the system depicted in FIG. 20) as well across an entire supply chain ecosystem (e.g., the ecosystem depicted in FIG. 19), multiple blockchains may be generated and aggregated during manufacture of a product or during traversal of the product through the supply and distribution chain. Some industrial blockchain systems can leverage these aggregated blockchains to correlate events within the facility or supply chain or to identify a chain of events. Accordingly, blockchain-enabled industrial devices 1102 or associated analytic systems can identify temporal relations between transactions among different blockchains. This can involve real-time synchronization of industrial blockchains for historian analysis. Analysis of synchronized industrial blockchains can assist with the process of identifying root causes of machine failures, product defects, or other issues. For example, an associated industrial blockchain analytic system can analyze a slice of time across multiple synchronized blockchains and identify chains with commonality in connection with identifying a root cause of a supply chain or manufacturing event of interest.

To facilitate root cause analysis, blockchains generated by industrial devices 1102 can be configured to capture transactions relating to operation and statuses of machines or production lines themselves. These machine history blockchains may be separate from those that capture transactions relating to manufacture of a product per se, and may capture, from the industrial devices and assets making up a manufacturing facility or supply chain, such information as diagnostic data, operating mode information, machine downtime durations and times, alarm information, telemetric data, or other such information. These blockchains can also capture records of maintenance actions, including but not limited to lock out/tag out actions, records of device or component replacements, operator actions gleaned from interactions with a control panel or HMI, or other such information. By capturing such information as blockchain transactions, industrial blockchains can create a tamper-proof ledger of information indicative of an exact state of a plant at any point in time. This information can be used in connection with troubleshooting issues within a facility or supply chain. These machine history or equipment history blockchains can also be correlated with the product-specific blockchains described above in order to determine a state of a machine or set of industrial assets corresponding to one or more manufactured products of interest. For example, if the blockchain transaction data for an item of manufactured product indicates a quality concern, this product-specific blockchain can be correlated in time with the machine-history blockchain for the production line responsible for manufacturing the product in order to determine if a state of the equipment that produced the product is relevant to the quality concern.

In an example implementation, a set of blockchain-enabled industrial devices 1102 that make up an industrial blockchain system can be configured to generate a plant model blockchain that models the production lines, machines, hardware components, and/or software components (e.g., firmware versions, application versions, etc.) that make up a manufacturing facility (or a production area within the facility). Devices 1102 can assemble these blockchains as the production lines and machines are powered up and the associated sets of equipment report their identity and status information. The devices 1102 can record this identity and status information for all devices within the plant model blockchain, yielding a Merkle tree of hashes in which each element of the tree represents an item of equipment. This plant model blockchain can record, for each device, such information as model numbers, software or firmware revision numbers, configuration settings (e.g., controller or variable frequency drive settings), operating mode information, maintenance log information, safety device statuses, total accumulated runtime data, operating modes, or other such device or asset information.

During plant operation, the plant model blockchain can record changes to the states of the devices and/or machines within the plant, treating each change of a device's state as a transaction to be recorded in the plant model blockchain. In this way, the plant model blockchain can record changes to machine operating modes, changes to a device's firmware or software, changes in states of industrial safety devices, abnormal conditions, diagnostic data, lock out/tag out actions, states of safety lock switches, states of operator panel control devices (e.g., pushbuttons, switches, etc.), sensor states (e.g., part presence indications), or other such information. Thus, the plant model blockchain creates a verified history of the of the plant's overall state, as defined by the aggregated states of the devices and machines that make up the plant. In some implementation, the plant model blockchain may comprise multiple synchronized blockchains corresponding to different production areas or machines within the plant. Analysis tools can be used to analyze these plant model blockchains to identify a chain of cause-and-effect events, or to determine a root cause of an event (e.g., a machine failure, detection of a product defect, etc.). In an example general technique, such analysis tools can identify and analyze a slice of time corresponding to an event of interest across the multiple synchronized plant model blockchains, and identify chains with commonality in connection with identifying the root cause of the event.

These plant model blockchains can also be referenced in connection with device replacements within the plant. In this regard, since the states and configurations of industrial devices currently deployed within the plant facility are recorded within a plant model blockchain, this information can be accessed to determine the correct firmware and/or application that should be installed on a new device that is to replace an existing device. Tracking this information using industrial blockchains can ensure that this replacement device configuration information is reliable, preventing misconfiguration of replacement devices prior to deployment This plant modeling technique can also be leveraged on a smaller scale to track states and events at the control cabinet level. In an example implementation, blockchain capabilities (e.g., blockchain engine 1128) can be implemented on motor drives (e.g., variable frequency drives or other types of motor drives) that are mounted within a motor control cabinet (MCC). This can allow the states of the MCC to be tracked, recorded, and analyzed.

Since the industrial blockchain paradigm records transactions originating at one industrial asset or device in a decentralized manner across multiple blockchain-enabled devices, each participating industrial device has a degree of visibility into the operation of other devices or systems by virtue of the distributed ledgers 1126 shared across the devices. In some embodiments, blockchain-enabled industrial devices 1102 can incorporate information in this distributed ledger 1126 into the device's control strategy. For example, as noted above, the blockchain-enabled industrial controller 1210 depicted in FIG. 18 executes a control program 1204 (e.g., a ladder logic program or other type of control program) in connection with monitoring and controlling an industrial machine, system, or process 1320 via I/O 1308. Since industrial controller 1210 supports blockchain functionality, the controller 1210 maintains one or more blockchain ledgers 1126 corresponding to public and/or private industrial blockchains 1304 that record transactions (e.g., industrial events, manufacturing and supply chain activities, etc.) within the blockchain system and/or ecosystem within which the controller 1210 participates. Each ledger 1126 records not only transactions that originate on the controller 1210 or its associated controlled process 1320, but also validated transactions (received as transaction data 1324 or ledger deltas) that originate at other devices or systems that participate in the blockchain system or ecosystem (e.g., other blockchain-enabled industrial devices associated with other production areas or machines within the plant, or devices associated with other entities of the supply chain outside the plant). As described above, these transactions are only added to the ledger 1126 after the transactions have been validated by the blockchain system using consensus-based validation techniques.

Since each industrial device within the blockchain system maintains a local copy of this ledger 1126 of validated transaction data, program execution component 1306 can be configured to leverage selected items of this ledger data in connection with controlling the system or process 1320. For example, control program 1204 can be written to reference one or more items of transaction data stored in the ledger 1126, such that these items of transaction data serve as parameters or inputs into the control program 1204 that at least partially control the states of one or more control outputs 1314. In this way, the blockchain-enabled industrial controller 1210 can control a system or process 1320 based not only on monitored local inputs from the system (input signals 1312), but also on events that occur at other production areas or machines within the plant.

This ledger-based control is not limited to the use of plant-level events to effect control of control outputs 1314. For example, if the ledger 1126 records business-level transactions (e.g., work order information, inventory information, etc.), program execution component 1306 can leverage this information as parameters or inputs into control program 1204. The ledger 1126 may also record validated events that originate at other supply chain entities within the larger blockchain ecosystem (e.g., part or sub-assembly suppliers, OEMs, retailers, shipping companies, etc.), and control program 1204 an be written to reference these external supply chain events as control parameters as well.

Figure 21:
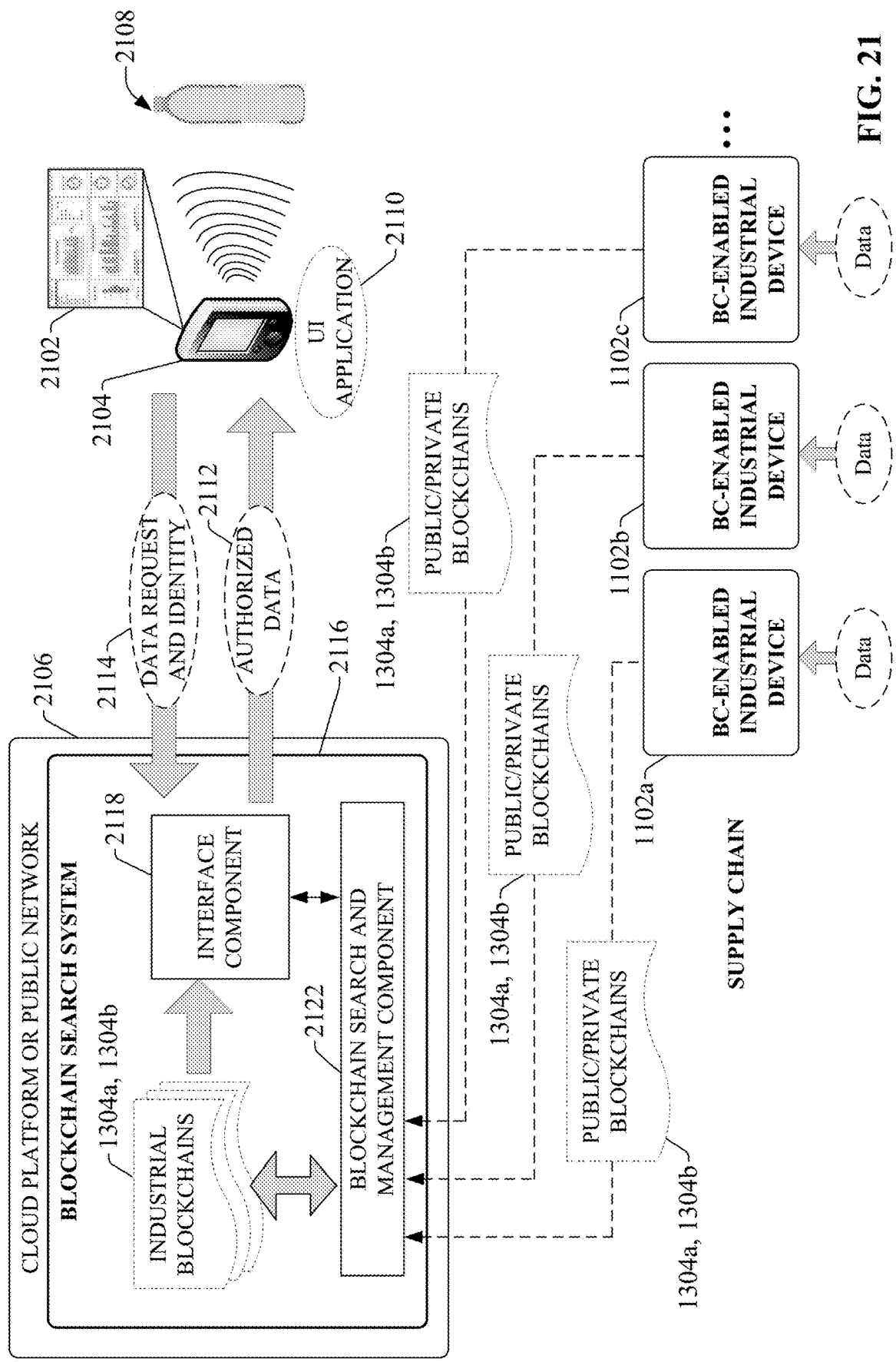
FIG. 21 is a diagram illustrating an example, high-level architecture for accessing blockchain information for a manufactured product using a mobile user interface application installed on a mobile device.

Participants in an industrial blockchain ecosystem can access blockchain information to which they have authorized access in a variety of ways. FIG. 21 is a diagram illustrating an example, high-level architecture for accessing blockchain information for a manufactured product using a mobile user interface application 2110 installed on a mobile device 2104. User interface application 2110 can be configured to interface with a publicly accessible blockchain search system 2106 maintained on a public network or cloud platform 2106. In an example implementation, blockchain search system 2106 can comprise an interface component 2118 and a blockchain search and management component 2122. These components of blockchain search system 2106 components can comprise, for example, machine-executable components embodied within one or more machines, e.g., embodied in one or more computer-readable mediums (or media) associated with one or more machines that are accessible via the cloud platform or public network 2106. These components can be stored on one or more memories and executed by one or more processors (not shown in FIG. 21) that make up part of blockchain search system 2106.

Blockchain search system 2106 can control remote access to versions of industrial blockchains 1304a, 1304b generated by industrial devices 1102 throughout a supply chain or other industrial blockchain ecosystem. In the illustrated example, user interface application 2110 allows a user to access subsets of relevant blockchain data associated with a finished product 2108 by scanning a scannable code, such as a QR code, imprinted on the product 2108 using the mobile device's optical scanning capabilities. The code establishes the identity of a source of the product's blockchain as well as the stored data to be accessed. When a product's code is scanned by the mobile device 2104 and an authentic user identifier is provided to the user interface application 2110, the application 2110 sends the request 2114 together with the user identity information to the interface component 2118 of search system 2118. Interface component 2118 can verify the identity included in request 2114 and determine a level of access associated with the identity. In response to determining that the identity is an authorized user identity and that the identity is permitted a degree of access to at least a subset of available industrial blockchain information, interface component 2118 instructs blockchain search and management component 2122 to search the blockchains 1304a, 1304b and retrieve a subset of relevant product data 2112 that the identified user is authorized to view based on the data request and identity. The interface component 2118 renders the results on mobile device 2104. The user interface application 2110 can be configured to generate suitable graphical screens 2102 for rendering the authorized product data 2112. Search and management component 2122 can be configured to retrieve the relevant blockchain data from any suitable source of the data accessible within the blockchain ecosystem, including but not limited to any of the blockchain-enabled industrial devices 1102 or other non-industrial sources of the requested data.

This approach can allow product consumers to access and view information about a purchased product via their personal devices. For example, if a batch of bottled water is found to be contaminated, scanning the label on a bottle using a mobile device 2104 can cause user interface application 2110 to interact with search system 2116 to locate and retrieve information identifying a source of the water for that particular bottle. This water source information can be maintained in a public blockchain accessible to consumers. Production details for the bottle itself (e.g., quality check results, cap tightening data, etc.) can also be accessed in this manner Some of this production data may only be accessible to plant personnel or consumers of certain roles. In the case of produce, data regarding the source of the produce (e.g., the farm) as well as the time that the produce was picked can be captured as a blockchain generated by the industrial equipment (including blockchain-enabled industrial devices 1102) that processes and packages the produce, such that the data can be retrieved by search system 2116 and presented on mobile device 2104 in response to scanning an optical code associated with the produce (e.g., a code on a tag affixed to the produce or on a bag containing the produce). In the case of pharmaceuticals, this approach can allow consumers to verify the authenticity of their medications by retrieving blockchain information that tracks the medication's supply chain. This supply chain information can be captured in a public blockchain and made accessible to consumers.

In some embodiments, user interface application 2110 can combine scanning of a product's optical code with voice-based or text-based search. In an example embodiment, after scanning the product's scannable code, the user can enter or speak a request for a certain type of data relating to the product into their mobile device 2104 (e.g., "Confirm that this product is organic," "where was this water bottled," etc.). In response, the user interface application 2110 translates the spoken information request into query information that can be combined with the scanned optical code information, submit this combined information to the blockchain search system on the cloud platform or public network 2106, and retrieve a relevant subset of product data that satisfies the user's request and is permitted to be viewed by that particular user (in accordance with the user's identity and/or role).

Blockchain search system 2116 can bundle and send blocks of industrial blockchains to customers upon request via the user interface application 2110, which can include interactive search features that assist the user in easily locating desired information. For example, rather than walking the blockchain to find information of interest, the user interface application 2110 can allow users to drill down to blockchain information they wish to see. In an example use case, a user may a time range into user interface application 2110 together with a request to view all products that were created within the specified time range of interest. In response to this information, blockchain search system 2116 can retrieve, from the relevant blockchains 1304a, 1304b, identifiers of products that were created within the specified time range. Also, external indices with links for selectable dimensions of the product can be built to allow desired information to be found more quickly.

Credit card purchases can also become transactions recorded in the blockchain for a product, allowing products to be traced to the end user (e.g., bottles with a cap that was produced as part of a specified batch can be traced to the owners of the bottles). Including consumer transactions in the product's blockchain can also allow notifications to be targeted to a specific subset of consumers known to have purchased a product (e.g., in the case of recall notifications for a particular batch of the product). Such notifications can be delivered to relevant client devices 2104 associated with known purchasers of a product by blockchain search system 2116 (e.g., by interface component 2118) in response to receiving a request to notify from an authorized vendor of the product. The request to notify can include, for example, an indication of the products for which a notification is to be delivered, a notification criterion that can be used to identify the subset of the products that are subject to the notification (e.g., a time range during which newly manufactured products are known to have been contaminated, a range of product serial numbers, a supplier known to have provided defective parts, etc.), and other relevant information that can be used by the system 2116 to determine which product purchasers should receive a notification. Based on the information included in the request to notify, the search and management component 2122 can map the subset of product serial numbers identified by the notification criterion to the individuals known to have purchased those identified products. This mapping can be determined based on the transaction information stored in the product's blockchain. Interface component 2118 can then deliver suitable notifications to the client devices 2104 associated with the identified purchases.

Including end user transactions as part of the product's blockchain can also allow the blockchain to be mined by sales entities for sales leads. In this way, sales people can readily determine what customers have ordered in the past, as well as identify who within a given company should be targeted for sales campaigns.

The configurability of the blockchain-enabled industrial devices 1102 can allow manufacturers to choose the information that customers are allowed to access. Manufacturers or their associates (e.g., suppliers, OEMs, etc.) can also retroactively add to the set of data that may be accessed by consumers. For example, if a supplier wishes to provide more specific information regarding the source of their water after the products have shipped, the accessibility level of this additional information can be changed from private to public, thereby retroactively rendering this information accessible to consumers.

Although FIG. 21 depicts a mobile device 2104 as the means by which industrial blockchain data is accessed, other means for retrieving and viewing the information are also within the scope of one or more embodiments. For example, HMI terminals and software can be configured to support blockchain interfaces that retrieve and visualize selected subsets of blockchain information relevant to a particular production area or plant facility within which the HMI terminal is installed. In another example implementation, HMI terminals can be configured to interface with blockchain search system 2116 over the public network 2106 in a manner similar to client device 2104, allowing operators to retrieve supply-chain level blockchain information from the HMI terminal.

Blockchain search system 2116 can also be used to execute actions associated with smart contracts in some embodiments. For example, if a smart contract is between an OEM and a manufacturing entity of the blockchain ecosystem includes a provision for the OEM to replace machine components or devices after a defined number of production cycles (or based on another time-based or event-based criterion, such as total energy consumption, part count, downtime or alarm frequency, a KPI setpoint, etc.), search system 2116 can monitor relevant subsets of data logged in blockchains 1304a or 1304b to determine when the trigger for replacing the component has been satisfied. This monitoring can be performed by self-initiated searches performed by blockchain search and management component 2122 on a periodic or continuous basis based on instructions contained in the smart contract. In response to determining, based on the monitoring, that the replacement condition defined by the smart contract has been satisfied, interface component 2118 can generate and deliver a notification to personnel associated with the OEM entity that the component must be replaced at the manufacturing entity per the smart contract. In variations of such embodiments, search system 2116 may also initiate other procedures associated with replacement of the part when the replacement trigger has been satisfied, including generating a purchase order, submitting the order to a vendor, scheduling an on-site visit by the OEM to replace the component, etc. In general, blockchain search system 2116 can be configured to enforce or execute provisions of a smart contract between entities of an industrial blockchain ecosystem by monitoring for conditions defined by the smart contract or for deviations from agreed provisions of the smart contract, and by executing appropriate notification, reporting, or control actions in line with the smart contract.

Figure 22:
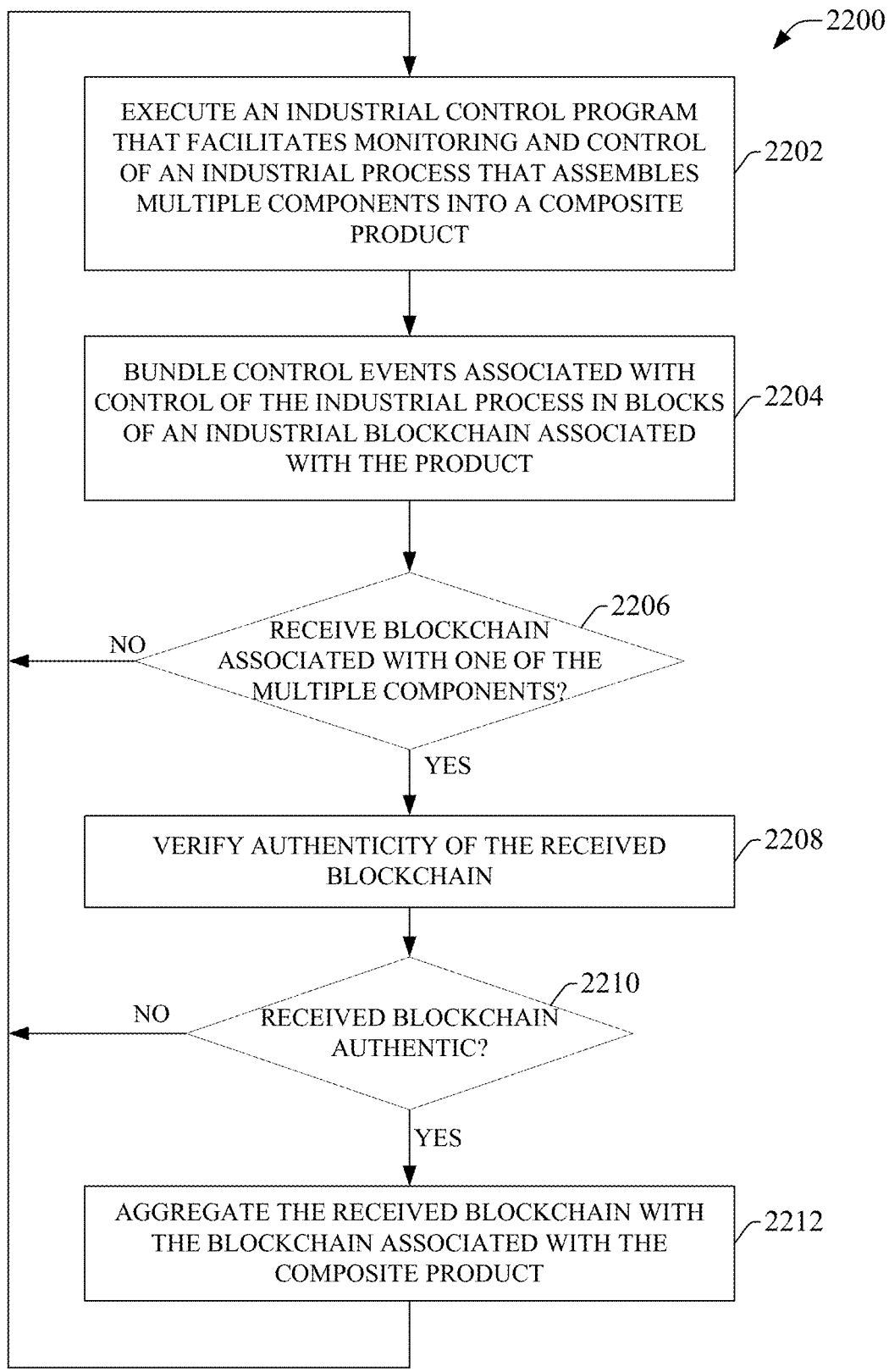
FIG. 22 is a flowchart of an example methodology for aggregating industrial blockchains in connection with manufacture of a composite product.
Figure 23:
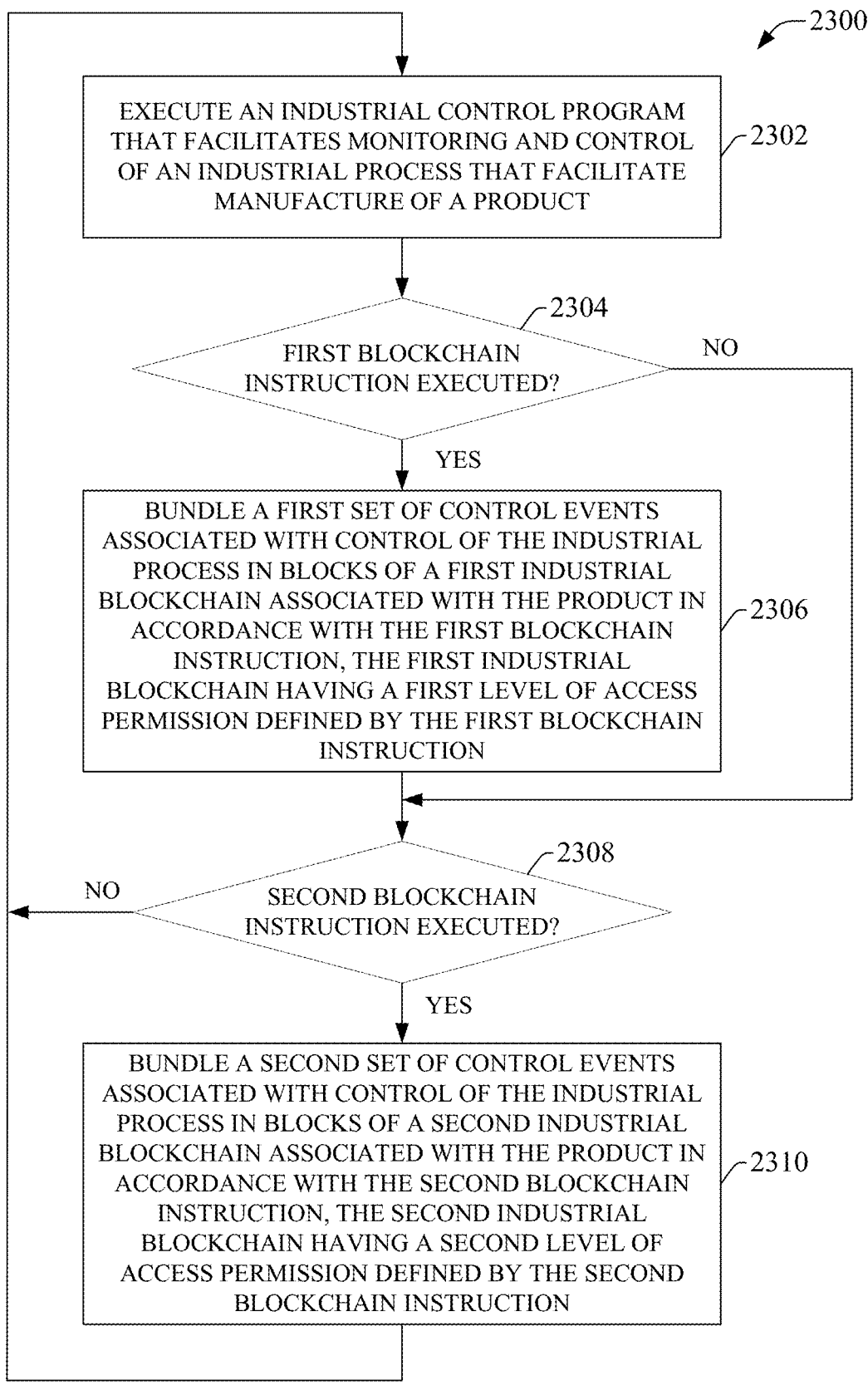
FIG. 23 is a flowchart of an example methodology for generating industrial blockchains having multiple levels of access permission.

FIGS. 22-23 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 22 illustrates an example methodology 2200 for aggregating industrial blockchains in connection with manufacture of a composite product. At 2202, an industrial control program is executed that facilitates monitoring and control of an industrial process that assembles multiple components into a composite product. The industrial process can include, for example, a bottling process that fills, labels, and caps a bottle of beverage, an automotive manufacturing process that assembles a vehicle or a sub-assembly thereof, a process that manufactures computer chips or electronic devices, a batch process, a mining operation, or other such industrial processes. The control program can be executed by an industrial controller having integrated blockchain capabilities.

At 2204, control events associated with control of the industrial process are bundled into blocks of an industrial blockchain associated with the product. In an example implementation, the control program may include industrial blockchain instructions that are configured to bundle the control events as validated transactions and record the transactions into one or more blocks of the industrial blockchain.

At 2206, a determination is made as to whether another blockchain associated with one of the multiple components that are assembled into the composite product has been received. The received blockchain may comprises manufacturing transactions associated with the corresponding component, which were recorded during production of the component by another production area or outside supplier facility. If such a blockchain is not received (NO at step 2206), steps 2202-2204 are repeated until a blockchain associated with one of the components is received.

If a blockchain associated with one of the multiple components received (YES at step 2206), the methodology proceeds to step 2208, where an authenticity of the received blockchain is verified. Verification of the received blockchain can be based on a consensus technique (e.g., proof-of-work, proof-of-state, practical *byzantine* fault tolerance, etc.) in which a consortium of devices within an industrial blockchain system, including the industrial controller and other industrial devices and/or non-industrial devices), collectively verify the received blockchain's authenticity. At 2210, a determination is made as to whether the result of step 2208 determines that the received blockchain is authentic. If the received blockchain is not authentic (NO at step 2210), the methodology returns to step 2202 and the received blockchain is not aggregated with the blockchain associated with the composite product. Alternatively, if the received blockchain is determined to be authentic (YES at step 2210), the received blockchain is aggregated into the blockchain associated with the composite product at step 2212.

FIG. 23 illustrates an example methodology 2300 for generating industrial blockchains having multiple levels of access permission. Initially, at 2302, an industrial control program is executed that facilitates monitoring and control of an industrial process that facilitates manufacture of a product. At 2304, a determination is made as to whether a first blockchain instruction of the industrial control program is executed. If the first blockchain instruction is executed (YES at step 2304), the methodology proceeds to step 2306, where a first set of control events associated with control of the industrial process is bundled into blocks of a first industrial blockchain associated with the product in accordance with the first blockchain instruction. Per configuration parameters of the first blockchain instruction, the first industrial blockchain have a first level of access permission defined by the first blockchain instruction. For example, the first industrial blockchain may be designated to be a fully public blockchain comprising data that can be accessed and viewed by all participants of the blockchain ecosystem (e.g., a product supply and distribution chain), or may be a private blockchain accessible only to authorized users within the industrial facility within which the industrial process is being carried out. The first industrial blockchain may be configured to be semi-public, such that the blockchain data can be viewed only by one or more selected outside entities within the blockchain ecosystem (e.g., an OEM, a supplier, or a customer entity). If the first blockchain instruction is not executed (NO at step 2304), the methodology proceeds to step 2308 without executing step 2306.

At 2308, a determination is made as to whether a second blockchain instruction of the industrial control program is executed. If the second blockchain instruction is executed (YES at step 2308), the methodology proceeds to step 2310, where a second set of control events associated with control of the industrial process is bundled into blocks of a second industrial blockchain associated with the product in accordance with the second blockchain instruction. Per the second blockchain instruction, the second industrial blockchain can have a second level of access permission that is different than the first industrial blockchain generated at step 2306.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 24:
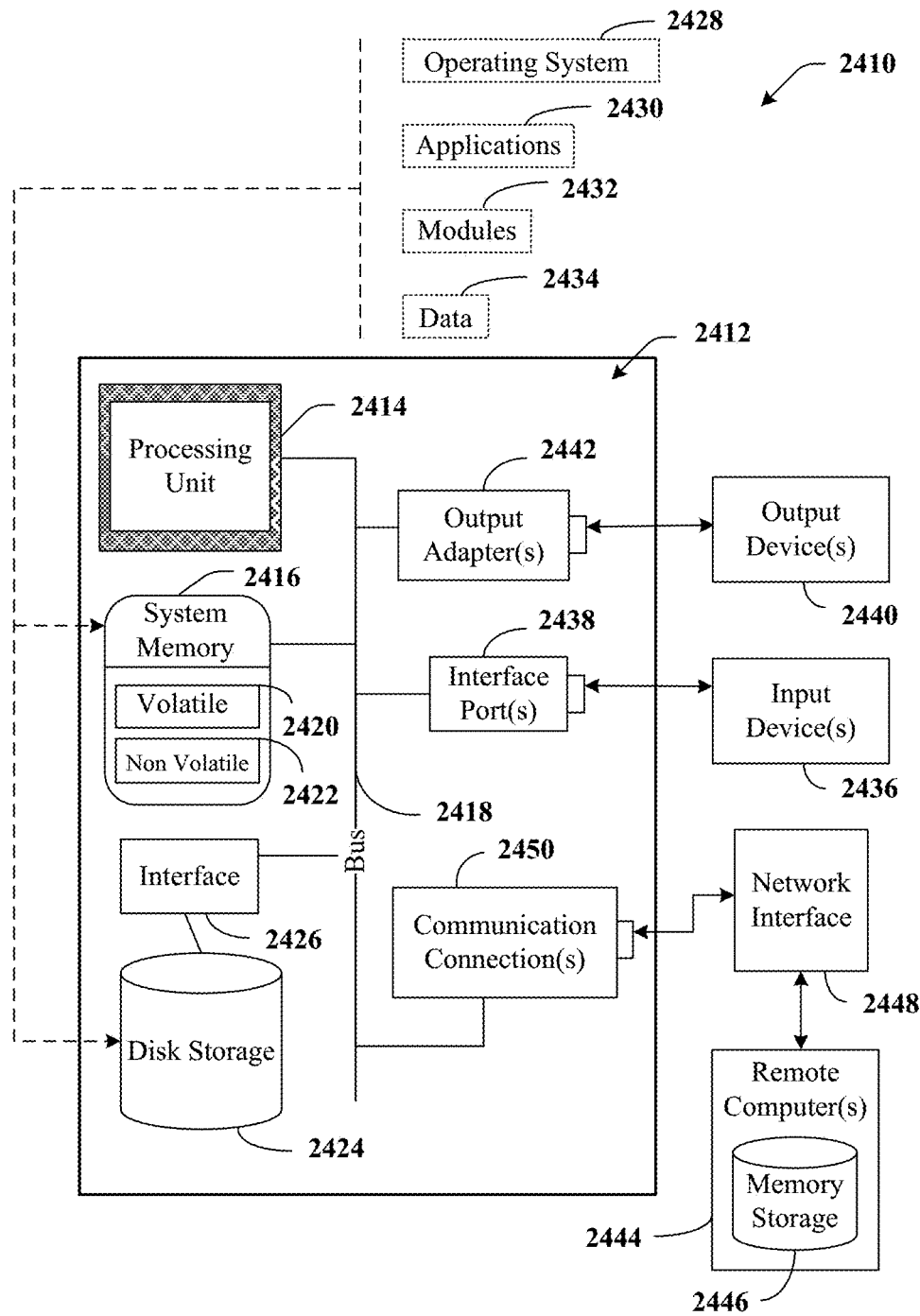
FIG. 24 is an example computing environment.
Figure 25:
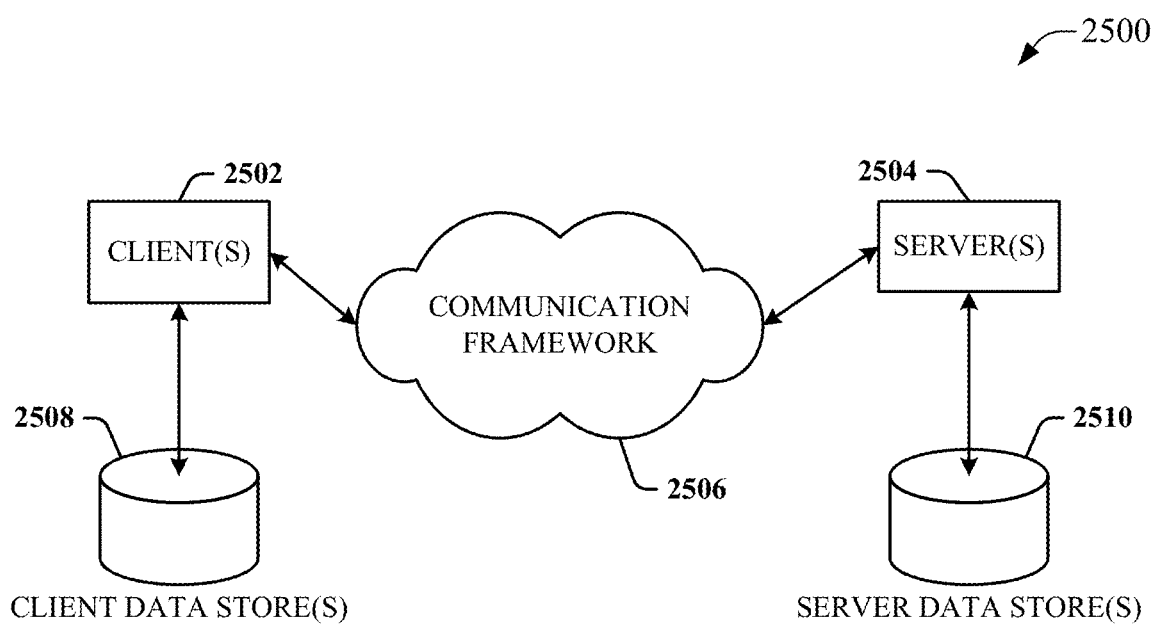
FIG. 25 is an example networking environment.

In order to provide a context for the various aspects of the disclosed subject matter, FIGS. 24 and 25 as well as the following discussion are intended to provide a brief, general description of a suitable environment in which the various aspects of the disclosed subject matter may be implemented.

With reference to FIG. 24, an example environment 2410 for implementing various aspects of the aforementioned subject matter includes a computer 2412 (where computer 2412 may be an industrial controller or other type of industrial device, a server device, or another type of computing device). The computer 2412 includes a processing unit 2414, a system memory 2416, and a system bus 2418. The system bus 2418 couples system components including, but not limited to, the system memory 2416 to the processing unit 2414. The processing unit 2414 can be any of various available processors. Multi-core microprocessors and other multiprocessor architectures also can be employed as the processing unit 2414.

The system bus 2418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2416 includes volatile memory 2420 and nonvolatile memory 2422. The basic input/output system (BIOS), containing the basic routines to transfer information between elements within the computer 2412, such as during start-up, is stored in nonvolatile memory 2422. By way of illustration, and not limitation, nonvolatile memory 2422 can include read only memory (ROM), programmable ROM (PROM), electrically programmable ROM (EPROM), electrically erasable PROM (EEPROM), or flash memory. Volatile memory 2420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2412 also includes removable/non-removable, volatile/non-volatile computer storage media. FIG. 24 illustrates, for example a disk storage 2424. Disk storage 2424 includes, but is not limited to, devices like a magnetic disk drive, floppy disk drive, tape drive, Jaz drive, Zip drive, LS-100 drive, flash memory card, or memory stick. In addition, disk storage 2424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2424 to the system bus 2418, a removable or non-removable interface is typically used such as interface 2426.

It is to be appreciated that FIG. 24 describes software that acts as an intermediary between users and the basic computer resources described in suitable operating environment 2410. Such software includes an operating system 2428. Operating system 2428, which can be stored on disk storage 2424, acts to control and allocate resources of the computer 2412. System applications 2430 take advantage of the management of resources by operating system 2428 through program modules 2432 and program data 2434 stored either in system memory 2416 or on disk storage 2424. It is to be appreciated that one or more embodiments of the subject disclosure can be implemented with various operating systems or combinations of operating systems.

A user enters commands or information into the computer 2412 through input device(s) 2436. Input devices 2436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2414 through the system bus 2418 via interface port(s) 2438. Interface port(s) 2438 include, for example, a serial port, a parallel port, a game port, and a universal serial bus (USB). Output device(s) 2440 use some of the same type of ports as input device(s) 2436. Thus, for example, a USB port may be used to provide input to computer 2412, and to output information from computer 2412 to an output device 2440. Output adapters 2442 are provided to illustrate that there are some output devices 2440 like monitors, speakers, and printers, among other output devices 2440, which require special adapters. The output adapters 2442 include, by way of illustration and not limitation, video and sound cards that provide a means of connection between the output device 2440 and the system bus 2418. It should be noted that other devices and/or systems of devices provide both input and output capabilities such as remote computer(s) 2444.

Computer 2412 can operate in a networked environment using logical connections to one or more remote computers, such as remote computer(s) 2444. The remote computer(s) 2444 can be a personal computer, a server, a router, a network PC, a workstation, a microprocessor based appliance, a peer device or other common network node and the like, and typically includes many or all of the elements described relative to computer 2412. For purposes of brevity, only a memory storage device 2446 is illustrated with remote computer(s) 2444. Remote computer(s) 2444 is logically connected to computer 2412 through a network interface 2448 and then physically connected via communication connection 2450. Network interface 2448 encompasses communication networks such as local-area networks (LAN) and wide-area networks (WAN). LAN technologies include Fiber Distributed Data Interface (I-DDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 2448 can also encompass near field communication (NFC) or Bluetooth communication.

Communication connection(s) 2450 refers to the hardware/software employed to connect the network interface 2448 to the system bus 2418. While communication connection 2450 is shown for illustrative clarity inside computer 2412, it can also be external to computer 2412. The hardware/software necessary for connection to the network interface 2448 includes, for exemplary purposes only, internal and external technologies such as, modems including regular telephone grade modems, cable modems and DSL modems, ISDN adapters, and Ethernet cards.

FIG. 25 is a schematic block diagram of a sample computing environment 2500 with which the disclosed subject matter can interact. The sample computing environment 2500 includes one or more client(s) 2502. The client(s) 2502 can be hardware and/or software (e.g., threads, processes, computing devices). The sample computing environment 2500 also includes one or more server(s) 2504. The server(s) 2504 can also be hardware and/or software (e.g., threads, processes, computing devices). The servers 2504 can house threads to perform transformations by employing one or more embodiments as described herein, for example. One possible communication between a client 2502 and servers 2504 can be in the form of a data packet adapted to be transmitted between two or more computer processes. The sample computing environment 2500 includes a communication framework 2506 that can be employed to facilitate communications between the client(s) 2502 and the server(s) 2504. The client(s) 2502 are operably connected to one or more client data store(s) 2508 that can be employed to store information local to the client(s) 2502. Similarly, the server(s) 2504 are operably connected to one or more server data store(s) 2510 that can be employed to store information local to the servers 2504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An industrial device, comprising:
 a memory that stores executable components; and
 a processor, operatively coupled to the memory, that executes the executable components, the executable components comprising:
  a program execution component configured to execute an industrial control program that processes input signals received from respective input devices of an industrial automation system and that controls output signals to respective output devices of the industrial automation system; and
  a blockchain engine configured to generate a plant model blockchain that models the industrial automation system based on identity information and status information received from the input devices and the output devices as the input devices and the output devices are powered up and report their respective identity information and status information,
  wherein the plant model blockchain records at least firmware version information for one or more devices of the industrial automation system, and the blockchain engine is further configured to, in response to detecting a change to a state of a machine of the industrial automation system, record the change as a transaction within the plant model blockchain, the change to the state comprising at least a change of a firmware version installed on a device, of the one or more devices, associated with the machine.

2. The industrial device of claim 1, wherein the industrial device is a cloud-based industrial controller.

3. The industrial device of claim 1, wherein the plant model blockchain models at least one of production lines, machines, hardware components, or software components that make up the industrial automation system.

4. The industrial device of claim 1, wherein the plant model blockchain comprises a tree of hashes comprising elements that represent respective items of equipment that make up the industrial automation system.

5. The industrial device of claim 1, wherein the plant model blockchain further records, for respective devices of the input devices and the output devices, at least one of a device model identifier, a software revision number, a configuration setting, an operating mode, maintenance log information, a safety status, or accumulated runtime data.

6. The industrial device of claim 1, wherein the change to the state further comprises at least one of a change of a machine operating mode, a change to a state of an industrial safety device, a transition to an abnormal condition, a transition to a different diagnostic state, initiation of a lock out/tag out action, a change of a state of a safety lock switch, a change of a state of an operator panel control device, or a change of a sensor state.

7. The industrial device of claim 1, wherein the blockchain engine is configured to generate multiple plant model blockchains, including the plant model blockchain, respectively corresponding to different production areas within a manufacturing facility.

8. The industrial device of claim 1, wherein he blockchain engine is further configured to participate in a consensus-based validation of an event originating at the industrial automation system or another industrial automation system, and the blockchain engine is configured to, as part of the consensus-based validation:

validate the event in response to a determination that the industrial device and at least one other industrial device on a blockchain network agree on a validity of the event, and in response to validation of the event, add a record of the event to a ledger of an industrial blockchain stored on the industrial device and on the other industrial device.

9. The industrial device of claim 8, wherein the program execution component is configured to control an output signal, of the output signals, based on the event in response to the validation of the event.

10. A method, comprising:

executing, by an industrial device comprising a processor, an industrial control program that processes input signals received from respective input devices of an industrial automation system;

controlling, by the industrial device, output signals to respective output devices of the industrial automation system based on the executing; and generating, by the industrial device, a plant model blockchain that models the industrial automation system based on identity information and status information received from the input devices and the output devices as the input devices and the output devices are powered up and report their respective identity information and status information, wherein the generating comprises recording, in the plant model blockchain, at least firmware version information for one or more devices of the industrial automation system, and in response to detecting a change to a state of a machine of the industrial automation system, recording the change as a transaction within the plant model blockchain, the change to the state comprising at least a change of a firmware version applied to a device associated with the machine.

11. The method of claim 10, wherein the generating further comprises generating the plant model blockchain to model at least one of production lines, machines, hardware components, or software components that make up the industrial automation system.

12. The method of claim 10, wherein the generating further comprises generating the plant model blockchain as a tree of hashes comprising elements that represent respective items of equipment that make up the industrial automation system.

13. The method of claim 10, wherein the generating further comprises recording, in the plant model blockchain for respective devices of the input devices and the output devices, at least one of a device model identifier, a software revision number, a configuration setting, an operating mode, maintenance log information, a safety status, or accumulated runtime data.

14. The method of claim 10, wherein the change to the state further comprises at least one of a change of a machine operating mode, a change to a state of an industrial safety device, a transition to an abnormal condition, a transition to a different diagnostic state, initiation of a lock out/tag out action, a change of a state of a safety lock switch, a change of a state of an operator panel control device, or a change of a sensor state.

15. The method of claim 10, wherein the generating further comprises generating multiple plant model blockchains, including the plant model blockchain, that model respective different production areas within a plant facility.

16. The method of claim 10, further comprising participating, by the industrial device, in a consensus-based validation of an event originating at the industrial automation system or another industrial automation system, wherein the participating comprises:

validating the event in response to a determination that the industrial device and at least one other industrial device on a blockchain network agree on a validity of the event, and in response to the validating, adding a record of the event to a ledger of an industrial blockchain stored on the industrial device and on the other industrial device.

17. A non-transitory computer-readable medium having stored thereon instructions that, in response to execution, cause an industrial device comprising a processor to perform operations, the operations comprising:

executing an industrial control program that processes input signals received from respective input devices of an industrial automation system;

controlling output signals to respective output devices of the industrial automation system based on the executing; and generating a plant model blockchain that models the industrial automation system based on identity information and status information received from the input devices and the output devices as the input devices and the output devices are powered up and report their respective identity information and status information, wherein the generating comprises recording, in the plant model blockchain, at least firmware version information for one or more devices of the industrial automation system, and in response to detecting a change to a state of a machine of the industrial automation system, recording the change as a transaction within the plant model blockchain, wherein the change to the state comprises at least a change of a firmware version installed on a device associated with the machine.

18. The non-transitory computer-readable medium of claim 17, wherein the generating further comprises generating the plant model blockchain to model at least one of production lines, machines, hardware components, or software components that make up the industrial automation system.

19. The method of claim 16, further comprising controlling an output signal, of the output signals, based on the event in response to the validating.

20. The non-transitory computer-readable medium of claim 17, wherein the generating further comprises generating the plant model blockchain as a tree of hashes comprising elements that represent respective items of equipment that make up the industrial automation system.

* * * * *